(12) United States Patent
Geeson et al.

(10) Patent No.: US 11,993,623 B2
(45) Date of Patent: May 28, 2024

(54) METHOD FOR PRODUCING PHOSPHORUS CHEMICALS FROM WET PROCESS PHOSPHATE

(71) Applicant: MASSACHUSETTS INSTITUTE OF TECHNOLOGY, Cambridge, MA (US)

(72) Inventors: Michael Baily Geeson, Boston, MA (US); Christopher C. Cummins, Dorchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 450 days.

(21) Appl. No.: 16/762,493

(22) PCT Filed: Nov. 8, 2018

(86) PCT No.: PCT/US2018/059814
§ 371 (c)(1),
(2) Date: May 7, 2020

(87) PCT Pub. No.: WO2019/094584
PCT Pub. Date: May 16, 2019

(65) Prior Publication Data
US 2021/0188885 A1    Jun. 24, 2021

Related U.S. Application Data

(60) Provisional application No. 62/685,979, filed on Jun. 16, 2018, provisional application No. 62/583,472, filed on Nov. 8, 2017.

(51) Int. Cl.
| | | |
|---|---|---|
| *C07F 9/50* | (2006.01) | |
| *C01B 25/08* | (2006.01) | |
| *C07F 9/38* | (2006.01) | |
| *C07F 9/6512* | (2006.01) | |

(52) U.S. Cl.
CPC .............. *C07F 9/509* (2013.01); *C01B 25/08* (2013.01); *C07F 9/3808* (2013.01); *C07F 9/5031* (2013.01); *C07F 9/6512* (2013.01)

(58) Field of Classification Search
CPC ...... C07F 9/509; C07F 9/3808; C07F 9/5031; C07F 9/6512; C01B 25/08
USPC ........................................................ 568/15
See application file for complete search history.

(56) References Cited

U.S. PATENT DOCUMENTS 2,907,785 A * 10/1959 Parshall ................ C08K 5/549
                                                          524/121

* cited by examiner

*Primary Examiner* — Kristin A Vajda
(74) *Attorney, Agent, or Firm* — Honigman LLP

(57) ABSTRACT

Preparation of phosphorus fine chemicals from phosphate sources is described.

20 Claims, 30 Drawing Sheets

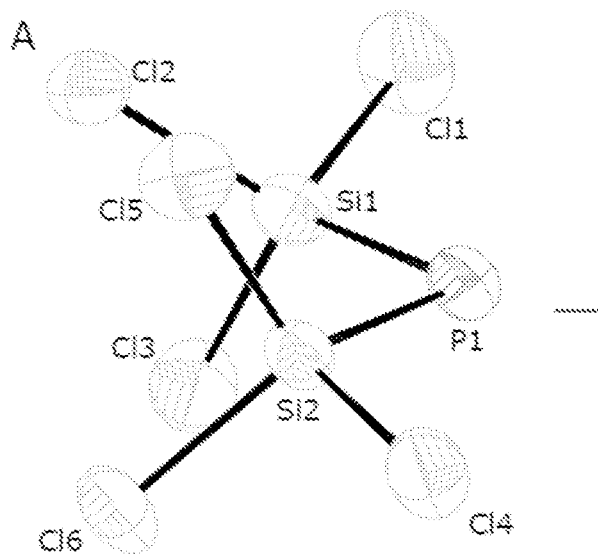
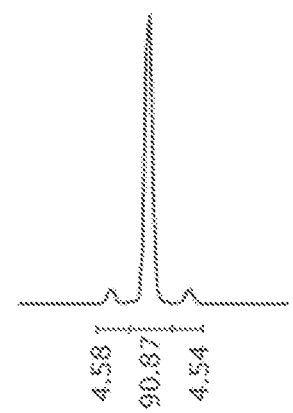
FIG. 3A  FIG. 3B
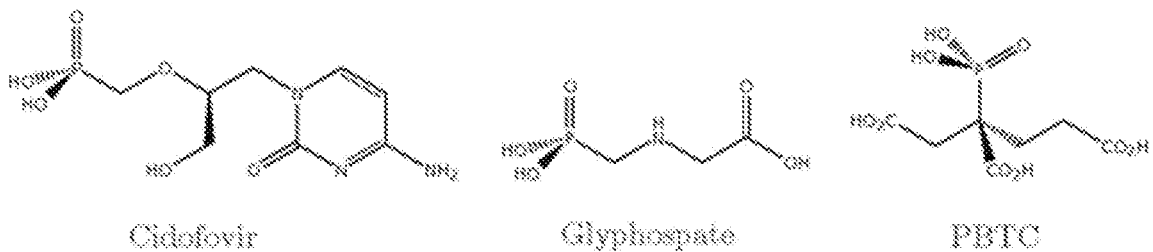
FIG. 4
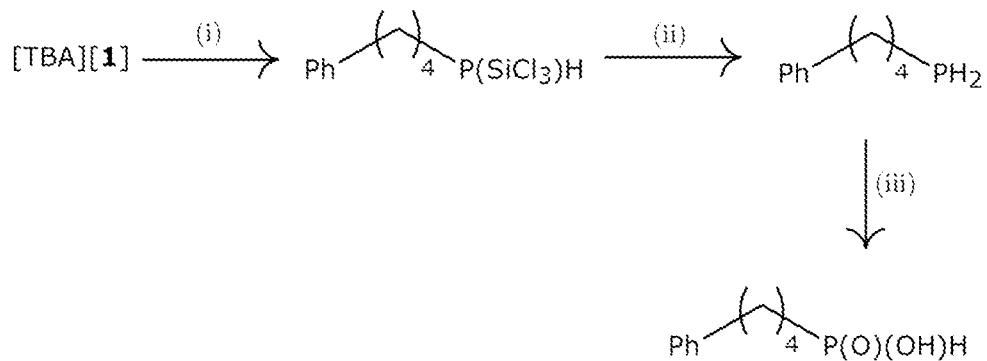
FIG. 5

Figure 10: Molecular structure of the bis(trichlorosilyl)phosphide anion, with thermal ellipsoids shown at the 50% the probability level.

Figure 11: Molecular structure of tetrabutylammonium cation, with thermal ellipsoids shown at the 50% probability level. Hydrogen atoms have been omitted for clarity.

METHOD FOR PRODUCING PHOSPHORUS CHEMICALS FROM WET PROCESS PHOSPHATE

The application claims the benefit under 35 USC 371 to International Application No. CT/US2018/059814, filed Nov. 8, 2018, which claims priority to U.S. Provisional Patent Application No. 62/583,472, filed Nov. 8, 2017, and U.S. Provisional Patent Application No. 62/685,979, filed Jun. 16, 2018, each of which is incorporated by reference in its entirety.

TECHNICAL FIELD

The invention relates to methods of producing phosphorus chemicals.

BACKGROUND

Phosphorus-containing fine chemicals can be made by the traditional high energy "thermal process", in which phosphate ore is reduced to white phosphorus. The white phosphorus is then converted to other phosphorus-containing chemicals.

SUMMARY

A process for the preparation of several classes of phosphorus-containing compounds that bypasses the traditional "thermal route" to white phosphorus is described. The invention centers around the synthesis of [TBA][1] which can be prepared from the trimetaphosphate anion, which itself is derived from the lower energy "wet process". See, for example, K. Schrodter, et al., *"Phosphoric Acid and Phosphates"*, Ullmann's Encyclopedia of Industrial Chemistry (Wiley-VCH Verlag GmbH & Co. KGaA, Weinheim, Germany, 2008), which is incorporated by reference in its entirety. [TBA][1] can be used for the preparation of compounds relevant to the agricultural, pharmaceutical, and battery industries. [TBA][1] is also envisioned as having applications in the semiconductor, flame retardant and oil (hydroformylation) industries.

In one aspect, a compound can include a bis(silyl)phosphide and a cation.

In certain circumstances, the cation can include hydrogen, a nitrogen-based cation, a phosphorus-based cation, an alkali metal cation, an alkali-earth metal cation, or an ionic liquid cation. In certain circumstances, the cation can be $[R_4N]^+$, where R is nBu, sBu, iBu, nPr, iPr, Et, or Me. For example, the cation can include $[R^4N]_+$, where R is nBu. In certain circumstances, the cation can be $[PPN]^+$.

In certain circumstances, the silyl can be $H_nSiX_{3-n}$ where X is a halogen, alkoxy, aryloxy, amido or arylamido and n is 0, 1, 2, or 3. The alkoxy group can be a C1-C8 alkoxy group. The amido can be a C1-C8 amido group. The aryloxy can be a substituted or unsubstituted C6-C10 aryl, optionally, a heteroaryl. The arylamido can be a substituted or unsubstituted C6-C10 aryl, optionally, a heteroaryl. For example, the silyl can be $SiX_3$ where X is a halogen.

In certain circumstances, the cation can be $[R_4N]^+$, where R is nBu and the silyl is $SiX_3$ where X is chloro.

In certain circumstances, silyl can be $SiX_3$ where X is chloro. In certain circumstances, silyl can be $SiX_3$ where X is fluoro.

In another aspect, a method of preparing a bis(silyl) phosphide can include contacting a phosphate-source with a silane reducing agent.

In certain circumstances, the silane reducing agent can be $H_nSiX_{4-n}$ where X is a halogen, alkoxy, aryloxy, amido or arylamido and n is 1, 2 or 3. The alkoxy group can be a C1-C8 alkoxy group. The amido can be a C1-C8 amido group. The aryloxy can be a substituted or unsubstituted C6-C10 aryl, optionally, a heteroaryl. The arylamido can be a substituted or unsubstituted C6-C10 aryl, optionally, a heteroaryl. For example, the silane reducing agent can be $H_nSiX_{44-n}$ where X is a chloro and n is 1.

In certain circumstances, the phosphate-source can include a phosphoric acid, a metaphosphate or an orthophosphate. For example, the phosphate-source can include $H_3PO_4$, $MH_2PO_4$, $M_2HPO_4$, $M_3PO_4$, where M is an alkali metal ion or organic cation. In another example, the phosphate-source can include a metaphosphates of varying ring size having a formula: $[P_mO_{3m}]^{m-}$, where m is 3-6) or a linear metaphosphate having the formula $(HPO_3)m$, wherein m is 3-6, or salts thereof. For example, the phosphate-source can include $[P_3O_9]^{3-}$.

In certain circumstances, the phosphate-source and the silane reducing agent can be heated in a closed vessel.

In another aspect, a method of preparing a phosphorus chemical can include contacting a bis(silyl)phosphide with an electrophilic reagent to form the phosphorus chemical.

In certain circumstances, the phosphorus chemical can be phosphine, a primary organic phosphine, a secondary organic phosphine, a secondary organic silyl phosphine, a tertiary organic silyl phoshine, a metal phosphide, an organophosphinic acid, an organo phosphonate, a secondary organic phosphine oxide, a diorganophosphinic acid, a phosphine, a monoacylphosphine, a diacylphosphine, a triacylphosphine or hexafluorophosphate anion. For example, the phosphorus chemical can be a secondary organic phosphine, in which case the method can include protecting the phosphine with a borane, such as $BH_3$. In another example, the phosphorus chemical can be a tertiary organo silyl phosphine, in which case the method can include the phosphine with a borane. In another example, the phosphorus chemical can be a primary organic phosphine or a secondary organic phosphine, in which case the method can include hydrolyzing a secondary organic silyl phosphine or tertiary organic silyl phosphine with water.

In certain circumstances, the phosphorus chemical can be phosphine and the electrophilic reagent is water.

In certain circumstances, the phosphorus chemical is a primary organic phosphine, a secondary organic phosphine, a secondary organic silyl phosphine, a tertiary organic silyl phosphine and the electrophilic reagent can be an $R^1$—$X^1$ compound, wherein $R^1$ is an organic group, for example, a primary alkyl, a secondary alkyl, a tertiary alkyl or an aryl and $X^1$ is a leaving group, for example, a halide, tosylate, triflate, or diazonium. The alkyl can be a C1-C18 alkyl, which can be optionally substituted or interrupted with O, S, NR, C=O, or a carbon—carbon double bond or carbon—carbon triple bond. The aryl can be a substituted or unsubstituted C6-C10 aryl, optionally, a heteroaryl.

In certain circumstances, the halide can be chloro.

In certain circumstances, the phosphorus chemical can be hexafluorophosphate anion and the electrophilic reagent can be fluorine or xenon fluorine.

In certain circumstances, the phosphorus chemical can be an organo phosphonate and the method can include oxidizing an organo phosphine with a peroxide. The peroxide can be hydrogen peroxide.

In certain circumstances, the phosphorus chemical can be an organophosphinic acid and the method can further include oxidizing a primary organic phosphine with a peroxide. The peroxide can be hydrogen peroxide.

In certain circumstances, the phosphorus chemical can be an organo phosphonate and the method can further include oxidizing a primary organic phosphine with a peroxide. The peroxide can be hydrogen peroxide.

In certain circumstances, the phosphorus chemical can be a secondary phosphine oxide and the method can further include oxidizing a secondary organic phosphine with a peroxide. The peroxide can be hydrogen peroxide.

In certain circumstances, the phosphorus chemical can be a diorganophosphinic acid and the method can further include oxidizing a secondary organic phosphine with a peroxide. The peroxide can be hydrogen peroxide.

In certain circumstances, the bis(silyl)phosphide can be generated by contacting a phosphate-source with a silane reducing agent in situ. For example, the method of preparing can be a one-pot synthesis.

In another aspect, a method of creating a carbon-phosphorus bond can include contacting a phosphate source with an alkylating agent.

In certain circumstances, the phosphate-source can include a phosphoric acid, a metaphosphate or an orthophosphate. In certain circumstances, the alkylating agent can include an organolithium, an organoaluminum, or an organozinc reagent. The alkylating agent can include an alkyl being a C1-C18 alkyl, which can be optionally substituted or interrupted with O, S, NR, or a carbon-carbon double bond or carbon-carbon triple bond.

In another aspect, a method of preparing a phosphorus chemical can include contacting a bis(silyl)phosphide with a nucleophilic reagent to form the phosphorus chemical.

In certain circumstances, the nucleophilic reagent can be an azide, a cyanide, a triflate, a halide, a carbon-based nucleophile, an oxygen-based nucleophile or a nitrogen-based nucleophile.

In certain circumstances, the phosphorus chemical can be an organophosphate, bis(trihalosilyl)phosphide or a trimethylsilylphosphine.

In another aspect, a method of preparing an organophosphate can include contacting a phosphoric acid, a polyphosphoric acid, a metaphosphate, or an inorganic source of phosphate with an alcohol to form the organophosphate.

In another aspect, a method of preparing phosphoryl chloride can include contacting a phosphoric acid, a polyphosphoric acid, a metaphosphate, or an inorganic source of phosphate with hydrogen chloride, an element oxy chloride, or an element chloride to form phosphoryl chloride.

In another aspect, a compound can include a bis(silyl) phosphine.

In certain circumstances, the silyl can be $H_2SiX_3$ where X is a halogen, alkoxy, aryloxy, amido or arylamido and n is 0, 1, 2 or 3. In certain circumstances, the silyl can be $SiX_3$ where X is fluoro.

In another aspect, a method of preparing a bis(silyl) phosphine can include contacting a bis(silyl)phosphide and a cation with an acid. In certain circumstances, the acid can be triflic acid.

In another aspect, a method of preparing a phosphorus chemical can include contacting a bis(silyl)phosphine with an electrophilic reagent to form the phosphorus chemical.

In certain circumstances, the phosphorus chemical can be phosphine. The phosphine can be phosphine, a primary organic phosphine, a secondary organic silyl phosphine, a secondary organic phosphine, a tertiary organic silyl phosphine, a metal phosphide, an organophosphinic acid, an organo phosphonate, a secondary organic phosphine oxide, a diorganophosphinic acid, a phosphine, a monoacylphosphine, a diacylphosphine, a triacylphosphine, a metal phosphide or hexafluorophosphate anion.

In another aspect, a method of preparing a phosphorus chemical can include contacting a bis(silyl)phosphine with an alkene.

In certain circumstances, the phosphorus chemical can be phosphine. The phosphorus chemical can be a primary organic phosphine, a secondary organic silyl phosphine, a secondary organic phosphine, a tertiary organic silyl phosphine, an organophosphinic acid, an organo phosphonate, a secondary organic phosphine oxide, a diorganophosphinic acid or a phosphine.

In certain circumstances, the organophosphate can be tris-(o-phenylenedioxy)phosphate and the alcohol is catechol.

In certain circumstances, the cation can be $[R_3NEI]^+$, where R is n-Bu, s-Bu, t-Bu, n-Pr, iPr, Et, or Me.

Other aspects, embodiments, and features will be apparent from the following description, the drawings, and the claims.

DESCRIPTION OF DRAWINGS

FIG. 3A is a depiction of a molecular structure of $[1]^-$ if with thermal ellipsoids at the 50% probability level and the TBA cation omitted for clarity. FIG. 3B is a $^{31}P$ NMR spectrum of [1] $^-$, showing $^{29}Si$ satellites.

FIG. 4 is a schematic depicting selected examples of commercially important phosphonate compounds.

FIG. 5 is a schematic showing the synthesis of 4-phenylbutylphosphinic acid, an intermediate in the synthesis of fosinopril, starting with [TBA][1]. Conditions: (i): 1 equiv. 1-chloro-4-phenylbutane in $HSiCl_3$ (ii) water or basic alumina (iii) 2.2 equiv. $H_2O_{2(aq)}$

DETAILED DESCRIPTION

Figure 1:
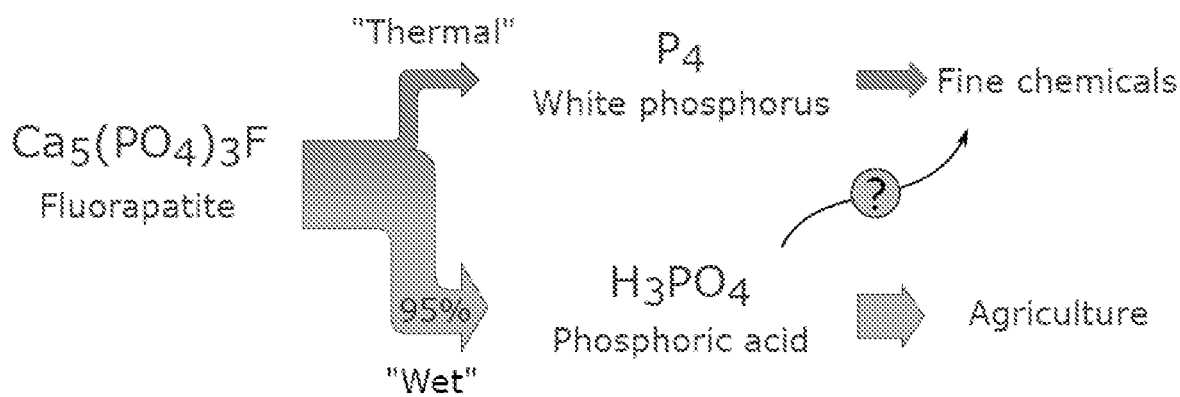
FIG. 1 is a schematic representation of the route to phosphorus fine chemicals.

A process for the synthesis of phosphorus-containing fine chemicals that bypasses the traditional high energy "thermal process", in which phosphate ore is reduced to white phosphorus, is described. The process has been used to prepare phosphorus-containing products relevant to the agricultural, pharmaceutical and energy industries. FIG. 1 is a schematic representation of the route to phosphorus fine chemicals by methods described herein. The new route is represented by the question mark.

Phosphorus is one of the six biogenic elements and is found in a range of materials and compounds relevant to the agricultural, battery, pharmaceutical, flame retardant, plastics and electronics industries. See, for example, J. E. Franz, J. A. Sikorski, M. K. Mao, *Glyphosate: A unique global herbicide* (Washington, DC : American Chemical Society, 1997); R. Younesi, G M. Veith, P. Johansson, K. Edstrom, T. Vegge, *Energy Environ. Sci.* 8, 1905 (2015); N. G. Anderson, et al., *Org. Process Res. Dev.* 1, 315 (1997); I. van der Veen, J. de Boer, *Chemosphere* 88, 1119 (2012); B. Elvers, F. Ullmann, eds., *Ullmann's polymers and plastics: products and processes. volume* 4 (Wiley-VCH Verlag GmbH & Co. KGaA, Weinheim, 2016); and G Bettermann, W. Krause, G Riess, T. Hofmann, "*Phosphorus Compounds, Inorganic*", *Ullmann's Encyclopedia of Industrial Chemistry* (Wiley-VCH Verlag GmbH & Co. KGaA, Weinheim, Germany, 2000), each of which is incorporated by reference in its entirety. In each of these cases, phosphorus invariably passes through one common intermediate: white phosphorus (P$_4$).

Traditionally, white phosphorus is prepared by the electrothermal reduction of phosphate rock, with the formation of carbon monoxide and calcium silicate as the two main byproducts (Eq. 1).

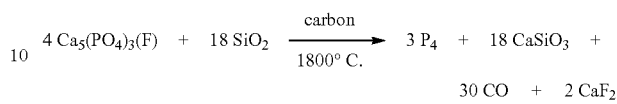

(1)

$$4\,Ca_5(PO_4)_3(F) + 18\,SiO_2 \xrightarrow[1800°\,C.]{carbon} 3\,P_4 + 18\,CaSiO_3 + 30\,CO + 2\,CaF_2$$

Conversion of phosphate rock to white phosphorus via what is known as the "thermal process" is a highly energy intensive process, requiring 12.5-13.5 kWh/kg of phosphorus.

See, for example, W. Schipper, *Eur. J. Inorg. Chem.* 2014, 1567 (2014), which is incorporated by reference in its entirety. Processing plants are therefore typically placed next to nuclear or hydroelectric power stations, limiting their possible geographic locations. While the thermal process represents only 5% of the total raw material inputs in the global processing of phosphate rock, 95% being via the wet process, it nonetheless accounts for 30% of the total energy consumed; thus, a move to wet process phosphate for phosphorus chemicals production is attractive from the standpoint of energy savings. See, for example, Phosphate Rock, U.S. Geological Survey Mineral Commodities Report, 2017, which is incorporated by reference in its entirety. The existing method also produces large quantities of carbon monoxide and carbon dioxide, which are toxic and a greenhouse gas respectively.

Figure 2:
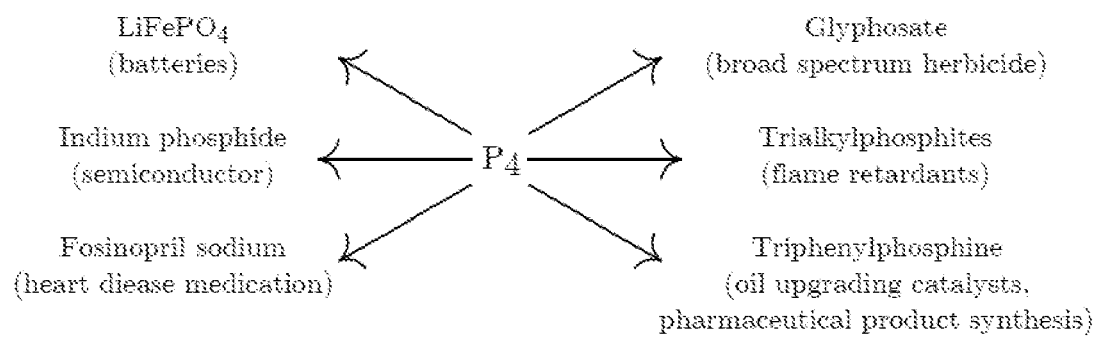
FIG. 2 is a schematic that depicts selected industrial uses of $P_4$.

FIG. 2 depicts selected industrial uses of P$_4$.

Trichlorosilane can be a reducing agent for phosphate to leverage the larger scale of the silicon industry to improve the economics and minimize the waste of phosphorus fine chemicals production. Trichlorosilane is an inexpensive high production volume (HPV) chemical, which is produced on a scale of 4,347M lb/yr in the US alone. See, for example, Chemical Data Access Tool (CDAT) on September 2017. It is primarily used as a precursor to high purity polycrystalline silicon, which is used in the semiconductor and solar photovoltaic industries. See, for example, W. Simmler, "*Silicon Compounds, Inorganic*", *Ullmann's Encyclopedia of Industrial Chemistry* (Wiley-VCH Verlag GmbH & Co. KGaA, Weinheim, Germany, 2000), which is incorporated by reference in its entirety. The demand for polycrystalline silicon is rising due to its use in solar panels, and approximately 90% of polycrystalline silicon is produced from trichlorosilane. See, for example, W. Zulehner, B. Neuer, G Rau, "*Silicon*", *Ullmann Encyclopedia of Industrial Chemistry* (Wiley-VCH Verlag GmbH & Co. KGaA, Weinheim, Germany, 2000), which is incorporated by reference in its entirety. This demand is likely to drive higher production volumes of trichlorosilane, which we use for the reduction of phosphate in the methods described herein.

Previous reports detail the preparation of phosphines bonded to the trichlorosilyl group by reduction of the corresponding chlorophosphine with trichlorosilane. See, for example, L.-P. Muller, W.-W. D. Mont, J. Jeske, P. G Jones, *Chem. Ber.* 128, 615 (1995); and L.-P. Muller, et al., *Chem. Ber.* 130, 377 (1997), each of which is incorporated by reference in its entirety. Additionally, organophosphates have been reduced to phosphine (PH$_{v3}$) by treatment with a borane. See, for example, R. Koster, W. Schußler, L. Synoradzki, *Chem. Ber.* 120, 1105 (1987), which is incorporated by reference in its entirety. The reduction of tertiary phosphine oxides with trichlorosilane to the corresponding tertiary phosphine is a commonly performed reaction in organic chemistry. See, for example, D. Herault, D. H. Nguyen, D. Nuel, G Buono, *Chem. Soc. Rev.* 44, 2508 (2015), which is incorporated by reference in its entirety. In all of these examples however, the phosphorus-containing starting materials have been prepared, at some point, via the reduction of phosphate rock to white phosphorus. The starting materials are all also organophosphorus compounds. The present method constitutes the first reduction of an inorganic source of phosphate, derived from the wet process, to valuable phosphorus-containing species using trichlorosilane. Alkyl chlorides, aromatic acids and ketones can also be reduced by trichlorosilane. See, R. A. Benkeser, *Acc. Chem. Res.* 4, 94 (1971), which is incorporated by reference in its entirety. In many of these examples, the reduction mechanism is thought to involve the trichlorosilyl anion. See, R. A. Benkeser, K. M. Voley, J. B. Grutzner, W. E. Smith, *J. Am. Chem. Soc.* 92, 697 (1970), which is incorporated by reference in its entirety.

A new route to several classes of phosphorus-containing compounds is described below. Instead of utilizing phosphorus derived from the high energy "thermal process", phosphorus obtained from the "wet process" has been targeted, in which phosphate rock is treated with concentrated sulfuric acid to give phosphoric acid (Eq. 2). Phosphoric acid can be converted to sodium trimetaphosphate by treatment with sodium chloride at 600 degrees C. and is an important commodity chemical (Eq. 3). See, D. Pham Minh, J. Ramaroson, A. Nzihou, P. Sharrock, *Ind. Eng. Chem. Res.* 51, 3851 (2012), which is incorporated by reference in its entirety. The sodium salt of trimetaphosphate was converted to the tetrabutylammonium (TBA) salt to enable studies to proceed under homogeneous reaction conditions in organic solvents and to facilitate analysis of products by typical laboratory characterization techniques such as nuclear magnetic resonance (NMR) spectroscopy (Eq. 4). Other suitable cations can include $[PPM]^+$, $[R_4N]^+$ where R is nBu, sBu, iBu, nPr, iPr, Et, or Me, a nitrogen-based cation, a phosphorus-based cation, an alkali metal cation, an alkali-earth metal cation or an ionic liquid cation.

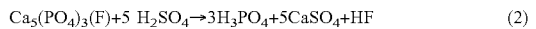

$$Ca_5(PO_4)_3(F) + 5\ H_2SO_4 \rightarrow 3H_3PO_4 + 5CaSO_4 + HF \quad (2)$$

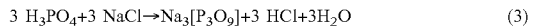

$$3\ H_3PO_4 + 3\ NaCl \rightarrow Na_3[P_3O_9] + 3\ HCl + 3H_2O \quad (3)$$

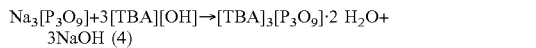

$$Na_3[P_3O_9] + 3[TBA][OH] \rightarrow [TBA]_3[P_3O_9] \cdot 2\ H_2O + 3NaOH \quad (4)$$

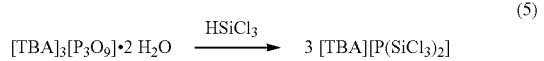

$$[TBA]_3[P_3O_9] \cdot 2\ H_2O \xrightarrow{HSiCl_3} 3\ [TBA][P(SiCl_3)_2] \quad (5)$$

As part of the method described herein, trichlorosilane can be used for the reduction of the trimetaphosphate anion to a new phosphorus-containing reagent, tetrabutylammonium bis(trichlorosilyl)phosphide, [TBA][1] (Eq. 5). Anion [1] has not been described previously and may in principle be paired with a variety of different cations to form new salts. The transformation of Eq. 5 is remarkable in accomplishing complete deoxygenation of the wet process phosphate. [TBA][1] can be effective as a reagent for the preparation of phosphorus-containing compounds that have previously only been accessible via the intermediacy of $P_4$. Ultimately, a process can be developed that eliminates the requirement for stoichiometric amounts of TBA (Eq. 6) (see below for additional discussion). Importantly, anion [1] need not always be isolated and may merely be generated in situ in the one-pot conversion of phosphorus atoms from trimetaphosphate to value-added chemicals.

Synthesis of [TBA][1]

[TBA][1] can be prepared on gram scales by heating $[TBA]_3[P_3O_9] \cdot 2\ H_2O$ in neat trichlorosilane at low (70 degrees C.) to moderate (150 degrees C.) temperatures in a sealed pressure vessel. An advantage of the preparation is a small tolerance to water, which is reduced to hydrogen by the action of excess trichlorosilane. [TBA][1] can be isolated as a white, crystalline, free-flowing powder by recrystallization from a dichloromethane/diethyl ether solution (FIG. 3A).

White phosphorus ($P_4$) is the linchpin intermediate for the synthesis of phosphorus-containing non-fertilizer chemicals, including pharmaceuticals, battery electrolytes, agrochemicals, catalyst ligands and phosphide materials. An alternative pathway to some of these compounds, described here, does not require the use of dangerous $P_4$. Alternatively, the bis(trichlorosilyl)phosphide anion ($[P(SiCL_3)_2]^-$,[1]$^-$), a synthetic precursor to alkylphosphines, can be prepared directly from crystalline phosphoric acid and trichlorosilane. This convenient one step procedure from commercially available materials can be used to prepare gram quantities of [TBA][1] in two steps from phosphate rock.

White phosphorus has long been the critical intermediate for the synthesis of nearly all phosphorus-containing non-fertilizer chemicals. See, for example, Schipper, W. Phosphorus: Too Big to Fail. *Eur. J. Inorg.Chem.* 2014, 2014, 1567-1571, Borger, J. E.; Ehlers, A. W.; Slootweg, J. C.; Lammertsma, K., Functionalization of $P_4$ through Direct P—C Bond Formation, *Chem.-Eur. J.* 2017, 23, 11738-11746, and Diskowski, H.; Hofmann, T. "*Phosphorus*", *Ullmann's Encyclopedia of Industrial Chemistry*; Wiley, 2000, each of which is incorporated by reference in its entirety. The production of white phosphorus, in what is known as the thermal process, requires the energy-intensive reduction of phosphate rock, conducted in an electric arc furnace at 1500° C., consuming ca. 13.5 kWh/kg of $P_4$ produced. See, Diskowski, H.; Hofmann, T. "*Phosphorus*", *Ullmann's Encyclopedia of Industrial Chemistry*; Wiley, 2000, which is incorporated by reference in its entirety. White phosphorus is a toxic and pyrophoric substance that has been used as a chemical warfare agent and its transport has led to high-profile catastrophes. See, Emsley, J. *The 13th element: the sordid tale of murder, fire and phosphorus*; Wiley: New York, 2000, which is incorporated by reference in its entirety. The thermal process for the production of $P_4$ has served a secondary role as a method of purification; the phosphorus volatilized from the electric arc furnace allows for it to be separated from chiefly sulfur- and silicon-containing impurities. See, for example, Schrodter, K.; Bettermann, G.; Staffel, T.; Wahl, F.; Klein, T.; Hofmann, T. "*Phosphoric Acid and Phosphates*", *Ullmann's Encyclopedia of Industrial Chemistry*; Wiley: Weinheim, Germany, 2008, which is incorporated by reference in its entirety. However, the thermal process struggles to separate arsenic, which is toxic to humans, because it replaces phosphorus in the $P_4$ lattice. See, Vahidnia, A.; van der Voet, G.; de Wolff, F. Arsenic neurotoxicity A review. *Hum. Exp. Toxicol.* 2007, 26, 823-832, Diskowski, H.; Hofmann, T. "*Phosphorus*", *Ullmann's Encyclopedia of Industrial Chemistry*; Wiley, 2000, and Cossairt, B. M.; Diawara, M.-C.; Cummins, C. C.

Facile Synthesis of AsP$_3$. *Science* 2009, 323, 602-602, each of which is incorporated by reference in its entirety.

In contrast, phosphoric acid, H$_3$PO$_4$, is produced by the "wet process", which involves treating phosphate rock with sulfuric acid. See, for example, Schrodter, K.; Bettermann, G.; Staffel, T.; Wahl, F.; Klein, T.; Hofmann, T. *"Phosphoric Acid and Phosphates", Ullmann's Encyclopedia of Industrial Chemistry*; Wiley: Weinheim, Germany, 2008, which is incorporated by reference in its entirety. The wet process, which accounts for the fate of 95% of the phosphate rock mined annually, operates on a larger scale than the thermal process. See, Diskowski, H.; Hofmann, T. *"Phosphorus", Ullmann's Encyclopedia of Industrial Chemistry*; Wiley, 2000, and U.S. Geological Survey, Phosphate Rock Mineral Commodity Summaries; 2017, each of which is incorporated by reference in its entirety. Improvements in purification methods mean that, nowadays, the purity of the phosphoric acid produced by the wet process phosphoric acid rivals that produced the thermal process, allowing wet process phosphoric acid to be used in food-grade applications. See, Gilmour, R. *Phosphoric acid: purication, uses, technology, and economics*; CRC Press/Taylor & Francis: Boca Raton, FL, 2014, which is incorporated by reference in its entirety. The higher energy requirements of the thermal process, in addition to the toxicity and pyrophoric properties of P$_4$, provide motivation for eliminating P$_4$ in favor of phosphoric acid as the key intermediate for the production of phosphorus-containing chemicals.

Figure 31:
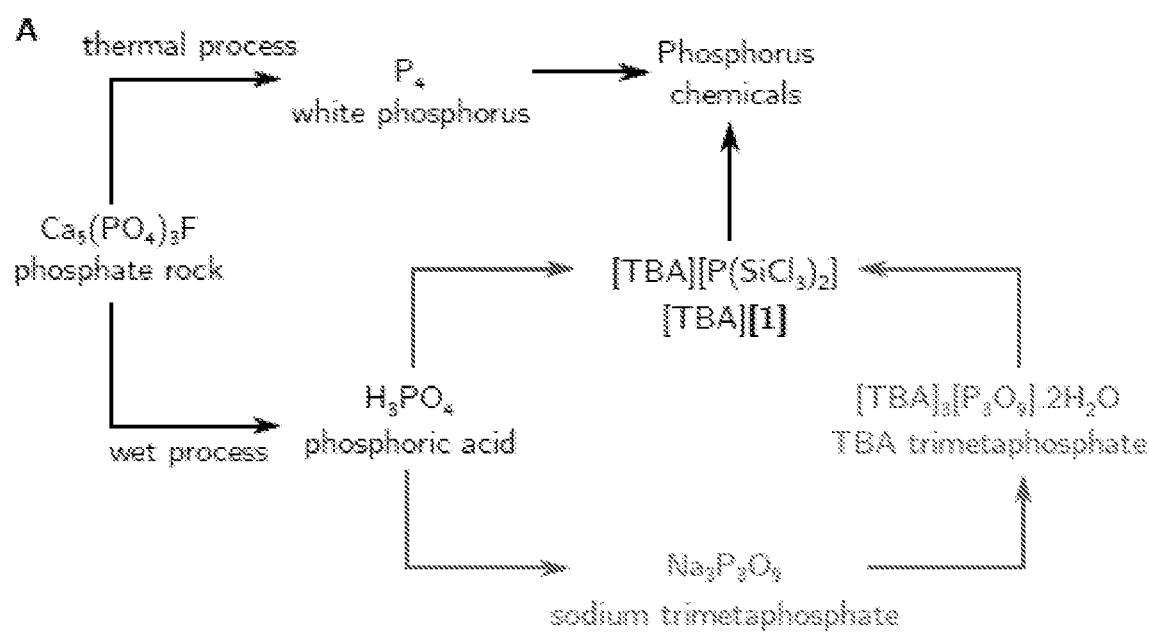
FIG. 31 depicts a schematic representation of the route to phosphorus fine chemicals.

As described here, one such process includes preparing the bis(trichlorosilyl)phosphide anion ([P(SiCl$_3$)$_2$]$^-$, [1]$^-$) as its tetrabutylammonium (TBA) salt by reduction of trimetaphosphate with trichlorosilane (FIG. 31). [TBA][1] was shown to be a versatile reagent for the preparation of several phosphorus-containing products previously only available from white phosphorus, such as the hexafluorophosphate ion, alkylphosphines, and PH$_{[TBA][}$1] does not need to be isolated and purified, and can instead be generated in situ for the conversion of alkyl chlorides to alkylphosphines.

The use of orthophosphate instead of trimetaphosphate as the phosphate-containing starting material would be desirable because it eliminates trimetaphosphate as an intermediate, which is produced by dehydration of monosodium dihydrogenphosphate at elevated temperatures (300-500° C.). See, for example, Schrodter, K.; Bettermann, G.; Staffel, T.; Wahl, F.; Klein, T.; Hofmann, T. *"Phosphoric Acid and Phosphates", Ullmann's Encyclopedia of Industrial Chemistry*; Wiley: Weinheim, Germany, 2008, and Pham Minh, D.; Ramaroson, J.; Nzihou, A.; Sharrock, P. One-Step Synthesis of Sodium Trimetaphosphate (Na$_3$P$_3$O$_9$) from Sodium Chloride and Orthophosphoric Acid. *Ind. Eng. Chem. Res.* 2012, 51, 3851-3854, each of which is incorporated by reference in its entirety. Despite the well-documented reactivity of water and alcohols with Si—Cl bonds to give silanols, (see, Cella, J. A.; Carpenter, J. C. Procedures for the preparation of silanols. *J. Organomet. Chem.* 1994, 480, 23-26, Takiguchi, T. Preparation of Some Organosilanediols and Phenylsilanetriol by Direct Hydrolysis Using Aniline as Hydrogen Chloride Acceptor. *J. Am. Chem. Soc.* 1959, 81, 2359-2361, and Kondo, S.-i.; Harada, T.; Tanaka, R.; Unno, M. Anion Recognition by a Silanediol-Based Receptor. *Org. Lett.* 2006, 8, 4621-4624, each of which is incorporated by reference in its entirety) the reaction conditions can tolerate the two equivalents of water that were present in the [TBA]$_3$[P$_3$O$_9$]·2H$_2$O starting material. Thus, sources of orthophosphate that contained acidic protons can be viable substrates for the preparation of [TBA][1].

Crystalline phosphoric acid, which is typically obtained from an aqueous 85% solution of H$_3$PO$_4$, (see, Ross, W. H.; Jones, R. M. The Solubility and Freezing-Point Curves of Hydrated and Anhydrous Orthophosphoric Acid. *J. Am. Chem. Soc.* 1925, 47, 2165-2170 and Smith, J. P.; Brown, W. E.; Lehr, J. R. Structure of Crystalline Phosphoric Acid. *J. Am. Chem. Soc.* 1955, 77, 2728-2730, each of which is incorporated by reference in its entirety) was tested as a precursor to anion [1]. The stable tetrabutylammonium salt of [1] was targeted, and so heated crystalline phosphoric acid and tetrabutylammonium chloride in neat trichlorosilane. An aliquot of the reaction mixture analyzed by $^{31}$P NMR spectroscopy displayed the characteristic chemical shift of anion [1]$^-$ at −171.7 ppm. After purification, [TBA][1] could be isolated. This method for the preparation of [TBA][1] is particularly attractive because it constitutes a one step procedure from commercially available starting materials (FIG. 31) and gives anion [1]$^-$ in two steps from phosphate rock.

Interestingly, it was found that pyrophosphate was formed under the reaction conditions. We isolated a white material at the end of the reaction that was insoluble in THF and DCM, but dissolved in water and displayed resonances in the $^{31}$P NMR spectrum attributable to orthophosphate and pyrophosphate. Trichlorosilane is clearly capable of condensing orthophosphate into longer chain polyphosphates, and this may play a role in the mechanism governing the formation of [TBA][1]. In terms of the scope of the phosphate-containing starting material, [TBA][H$_2$PO$_4$] also serves as a suitable precursor to [TBA][1] when treated with trichlorosilane.

[TBA][1] can be prepared directly from phosphoric acid

(5A)

Typical conditions are 110° C. for 72 hours. An idealized balanced equation follows:

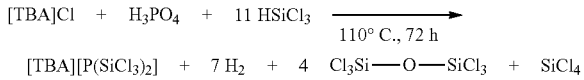

H$_2$ produced by the formation of [TBA][1] from H$_3$PO4 gave H$_2$ according to the following equation:

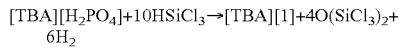

To determine the fate of the oxygen atoms originating from the oxoanions, we analyzed the volatile liquid products at the end of the reaction. Following the synthesis of [TBA][1], volatile material was removed under reduced pressure from the reaction vessel and condensed in a liquid nitrogen cooled trap. Analysis of the collected material by quantitative $^{29}$Si NMR spectroscopy provided an in situ yield of hexachlorodisiloxane. We note that in the equation above, an equivalent of hexachlorodisiloxane can be replaced by one equivalent of polymeric (Cl$_2$SiO)$_n$ and one of silicon tetrachloride (SiCl$_4$). Silicon tetrachloride was observed by $^{29}$s5i NMR spectroscopy, and evidence for the presence of (Cl$_2$SiO)$_n$ was provided by the formation of a white material, that was insoluble in organic solvents such as DCM and THF, but dissolved in 1 M aqueous sodium hydroxide to give a solution that contained silicon-containing products by $^{29}$Si NMR spectroscopy.

Phosphorus-carbon Bond Formation

The methods described herein allow for the selective synthesis of primary and secondary alkyl phosphines. One advantage of the methods described hererin is the use of alkyl chlorides as the carbon-based electrophile, which are more widely available and less expensive than their corresponding bromo- and iodo-analogues. See, for example, M. J. Dagani, H. J. Barda, T. J. Benya, D. C. Sanders, *"Bromine Compounds", Ullmann Encyclopedia of Industrial Chemistry* (Wiley-VCH Verlag GmbH & Co. KGaA, Weinheim, Germany, 2000), which is incorporated by reference in its entirety. An additional advantage of using chloroalkanes as alkylating agents for phosphorus is the ability to avoid over-alkylation of phosphorus, due to the reduced capacity of chloride as a leaving group and the stronger C—Cl bond strength compared to bromo- and iodo-analogues. See, for example, J. March, *Advanced Organic Chemistry* (Wiley, New York, 1992), which is incorporated by reference in its entirety.

Primary and Secondary Phosphines

A major use of primary and secondary alkyl-phosphines is for the synthesis of tertiary phosphines, which are used as ligands in transition metal catalyzed reactions such as the Buchwald-Hartwig coupling. See, for example, J. F. Hartwig, *Angew. Chem., Int. Ed.* 37, 2046 (1998), which is incorporated by reference in its entirety. These coupling reactions are extensively used in fine-chemical manufacturing of pharmaceutical precursors, electronic materials, and agricultural chemicals. See, for example, H.-U. Blaser, A. Indolese, F. Naud, U. Nettekoven, A. Schnyder, *Adv. Synth. Catal.* 346, 1583 (2004), which is incorporated by reference in its entiety. Tertiary phosphines have also been used in the synthesis of quantum dots and in environmental sciences for the determination of traces of thiols in water. See, for example, S. Tamang, C. Lincheneau, Y. Hermans, S. Jeong, P. Reiss, *Chem. Mater.* 28, 2491 (2016); and Mathey, Trost, eds., *Science of Synthesis* (Georg Thieme Verlag, Stuttgart, 2009), first edn, which is incorporated by reference in its entirety. Secondary phosphines can be important reagents for transition-metal-catalyzed hydrophosphination reactions. See, for example, D. S. Glueck, *C-X Bond Formation*, A. Vigalok, ed., no. 31 in Topics in Organometallic Chemistry (Springer Berlin Heidelberg, 2010), pp. 65-100, which is incorporated by reference in its entirety.

Preparation of bis(trichlorosilyl)phosphine and its use in hydrophosphination reactions and for the preparation of phosphide-containing materials Background to Hydrophosphination Compounds containing phosphorus-hydrogen bonds are valuable substrates for hydrophosphination reactions, which are used to prepare phosphorus-carbon bond containing products. See:

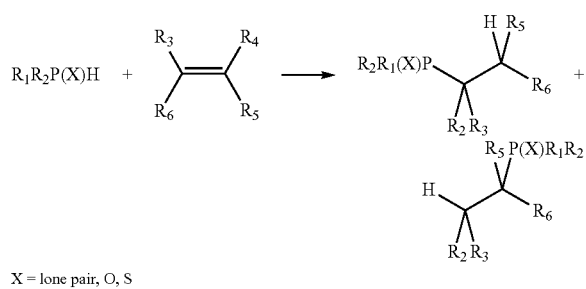

X = lone pair, O, S

General Example of a Hydrophosphination Reaction

Some examples of commercially useful phosphorus-carbon bond-containing products derived from hydrophosphination reactions are chiral phosphine ligands (see, V. S. Chan, M. Chiu, R. G Bergman, F. D. Toste, *J. Am. Chem. Soc.* 131, 6021 (2009) and V S. Chan, I. C. Stewart, R. G Bergman, F. D. Toste, *J. Am. Chem. Soc.* 128, 2786 (2006), each of which is incorporated by reference in its entirety) and molecules of importance to the pharmaceutical industry (N. G Anderson, et al., Org. Process Res. Dev. 1, 315 (1997), which is incorporated by reference in its entirety). Hydrophosphination reactions are notable for their high atom-economy and the broad scope and commercial availability of the substrates that can be used (O. Delacroix, A. Gaumont, *Curr. Org. Chem.* 9, 1851 (2005), which is incorporated by reference in its entirety).

Background to Phosphide-containing Materials

Metal phosphides are materials that have a broad range of applications. For example, nickel phosphide has been shown to be an efficient and inexpensive electrocatalyst for electrochemical water-splitting (R. Zhang, et al., *ACS Appl. Mater. Interfaces* 9, 14013 (2017), which is incorporated by reference in its entirety). Indium phosphide is an important component of quantum dots, which have applications in the medical and electronics industries (S. Tamang, C. Lincheneau, Y Hermans, S. Jeong, P. Reiss, *Chem. Mater.* 28, 2491 (2016), which is incorporated by reference in its entirety). Other phosphides such as aluminum phosphide or calcium phosphide find use in the fumigation industry (G. Bettermann, W. Krause, G. Riess, T. Hofmann, *"Phosphorus Compounds, Inorganic", Ullmann's Encyclopedia of Industrial Chemistry* (Wiley-VCH Verlag GmbH & Co. KGaA, Weinheim, Germany, 2000), which is incorporated by reference in its entirety). Metal phosphides are typically prepared from either phosphine (PH$_3$) (L. Li, M. Protire, P. Reiss, *Chemistry of Materials* 20, 2621 (2008), which is incorporated by reference in its entirety) or tris(trimethylsilyl)phosphine (P(SiMe$_3$)$_3$) (M. D. Healy, P. E. Laibinis, P. D. Stupik, A. R. Barron, *J. Chem. Soc., Chem. Commun.* 0,359 (1989), which is incorporated by reference in its entirety), which are toxic and pyrophoric, respectively. It is therefore of interest to find new methods for the preparation of metal phosphide materials.

Preparation of HP(SiCl$_3$)$_2$ by protonation of [TBA][P(SiCl$_3$)$_2$]

Protonation of [TBA][P(SiCl$_3$)$_2$] with acids such as trifluoromethanesulfonic acid result in formation of neutral bis(trimethylsilyl)phosphine as the phosphorus-containing product (Eqn. 6A):

$$[TBA][P(SiCl_3)_2] + HA \rightarrow HP(SiCl_3)_2 + [TBA][A] \qquad (6A)$$

The resulting bis(trichlorosilyl)phosphine is identified by a singlet in the $^{31}$P{$^1$H} NMR spectrum at −171.3 ppm and also displays $^{29}$Si satellites with a $^1$JP-si value of 56 Hz. In the $^{31}$P NMR spectrum, a doublet is centered at −171.3 ppm, displaying a $^1$JP-si value of 206 Hz. HP(SiCl$_3$)$_2$ can be obtained by distillation. Alternatively, the use of a solvent such as diethyl ether, in which the byproduct tetrabutylammonium triflate is insoluble, allows for a solution of HP(SiCl$_3$)$_2$ to obtained by filtration.

Use of HP(SiCl$_3$)$_2$ in hydrophosphination reactions

Use of either neat HP(SiCl$_3$)$_2$, or solutions of HP(SiCl$_3$)$_2$ generated as described above, can be used for the preparation of new phosphorus-carbon bond-containing products. Appropriate substrates in these hydrophosphination reactions include alkenes, dienes and alkynes. In some cases, the reaction is promoted by thermal, radical, basic or acidic conditions. Suitable radical initiators include 2,2-azobis(2-methylpropionitrile).

Alternatively, transition-metal-containing catalysts can be used to facilitate the hydrophosphination reactions with $HP(SiCl_3)_2$. One advantage of this method is that a chiral transition metal catalyst can be used to prepare chiral phosphorus-carbon bond-containing products.

Use of $HP(SiCl_3)_2$ for the preparation of phosphide-containing materials $HP(SiCl_3)_2$ can be used to prepare phosphide containing materials, along the lines of Eqn. 6B:

$$a\ HP(SiCl_3)+bMX_n \rightarrow M_bP_a+bHX+(b \times a)\ XSiCl_3 \quad (6B)$$

where 3a=bn. M can be a transition-metal element, or alternatively a p-block or s-block element. X can be a halide (F, Cl, Br, I) or pseudohalide (for example, triflate, tosylate, acetate, acetylacetonate or a carboxylate). An advantage of the reaction is that the byproducts are neutral species that can be removed using reduced pressure. Alternatively, washing the phosphide precipitate with an organic solvent removes the neutral byproducts of the reaction. Examples of some of the substrates that can be used in this reaction are nickel(II) chloride, indium(III) myristate and magnesium(II) acetylacetonate which furnish nickel phosphide, indium phosphide nanoparticles, and magnesium phosphide respectively.

Phosphonates

Another use of primary phosphines is for the production of phosphonates, which can be accomplished by treating a primary phosphine with a 30% aqueous hydrogen peroxide solution (Eq. 7). See, for example, Mathey, Trost, eds., *Science of Synthesis* (Georg Thieme Verlag, Stuttgart, 2009), first edn., which is incorporated by reference in its entirety.

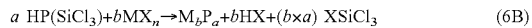

$$RPH_2 \xrightarrow{H_2O_2} RPO_3H_2 \quad (7)$$

Phosphonates are a class of organophosphorus compounds of growing importance, finding uses in the medical (Cidofovir), agricultural (glyphosate) and metal-extraction (2-phosphonobutane-1,2,4-tricarboxylic acid, PBTC) industries. See, for example, J. E. Franz, J. A. Sikorski, M. K. Mao, *Glyphosate: A unique global herbicide* (Washington, DC; American Chemical Society, 1997); and J. Svara, N. Weferling, T. Hofmann, "*Phosphorus Compounds, Organic*", *Ullmann Encyclopedia of Industrial Chemistry* (Wiley-VCH Verlag GmbH & Co. KGaA, Weinheim, Germany, 2006), which is incorporated by reference in its entirety. The structural diversity of selected phosphonates are shown in (FIG. 4).

Phosphonates have also been employed as a component in ion-exchange resins, which are used to separate heavy metal ions from solution. See, for example, R. Silbernagel, C. H. Martin, A. Clearfield, *Inorg. Chem.* 55, 1651 (2016), which is incorporated by reference in its entirety. Other important uses of phosphonates are in the fields of catalysis, photochemistry, water treatment and as surfactants. See, for example, A. Clearfield, Z. Wang, *J. Chem. Soc., Dalton Trans.* pp. 2937-2947 (2002); A. Clearfield, *Curr. Opin. Solid State Mater. Sci.* 1, 268 (1996); Q. Long, et al., *Environ. Sci. Technol.* 50, 12022 (2016); S. A. Bagshaw, E. Prouzet, T. J. Pinnavaia, *Science* 269, 1242 (1995), which is incorporated by reference in its entirety. Recently, phosphonates have been used as precursors to nickel phosphide materials, which were shown to be efficient catalysts for the hydrogen evolution reaction. See, for example, R. Zhang, et al., *ACS Appl. Mater. Interfaces* 9, 14013 (2017), which is incorporated by reference in its entirety.

Four classes of compounds (in each case [O] represents one equivalent of hydrogen peroxide) can be accessed.

i) $R-PH_2+2[O] \rightarrow R-P(O)(OH)H$

Primary phosphine to organophosphinic acid ii) $R-PH_2+3[O] \rightarrow R-P(O)(OH)_2$ Primary phosphine to organo phosphonate iii) $R_2PH+[O] \rightarrow R_2P(O)H$ Secondary phosphine to secondary organo phoshine oxide iv) $R_2PH+2[O] \rightarrow R_2P(O)(OH)$ Secondary phosphine to diorganophosphinic acid Preparation of primary alkyl phosphines from [TBA][1]

[TBA][1] can be used to prepare primary alkyl phosphines, by treatment with an alkyl chloride (RCl in Eq. 8) and trichlorosilane (Eq. 8). The crude product of the reaction was identified by $^{31}P$ NMR spectroscopy as an alkyl(trichlorosilyl)phosphine, which could be converted to the corresponding primary phosphine using either water or basic alumina. Primary alkyl phosphines produced by this reaction are isolated as spectroscopically pure compounds by distillation. The product of alkyl chloride with a bis(silyl)phosphine can be either $RP(SiCl_3)H$ (secondary organo silyl phosphine) or $R_2P(SiCl_3)$ (tertiary organo silyl phosphine) depending on conditions. $RP(SiCl_3)H$ can be in principle used for the synthesis of chiral phosphine ligands by i) alkylation with R'—Cl to give RR'P—H then ii) deprotonation with n-BuLi followed by quenching with R"—Cl to give RR'R"P.

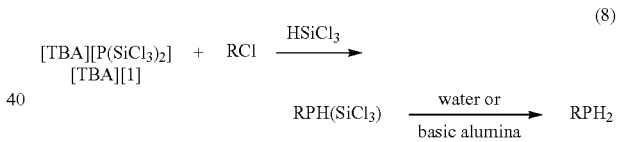

(8)

Figure 35:
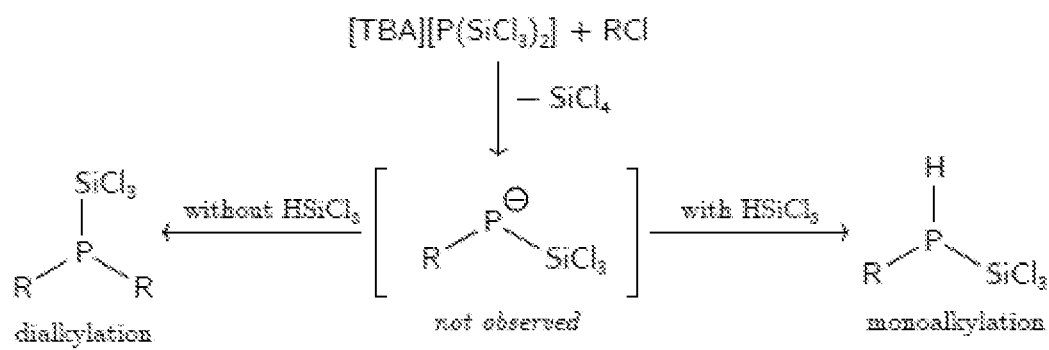
FIG. 35 depicts a scheme for synthesis of an organic phosphine.

In one example, trichlorosilane can protonate a phosphide intermediate, as shown in FIG. 35.

Preparation of primary alkyl phosphines from $[TBA]_3[P_3O_9] \cdot 2H_2O$

A one-pot protocol for the direct conversion of trimetaphosphate to primary phosphines is described. An advantage of this method is that it does not require isolation of [TBA][1] and therefore reduces the time, material and energy requirements of the reaction. In a typical procedure, an alkyl chloride is heated with $[TBA]_3[P_3O_9] \cdot 2H_2O$ and trichlorosilane in a sealed pressure vessel at 120 degrees C. (Eq. 9). The crude alkyl(trichlorosilyl)phosphine is subjected to the same work-up as described above in Eq. 8 to give the desired primary phosphine product.

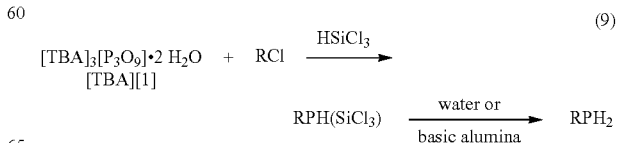

(9)

Preparation of secondary alkyl phosphines from [TBA][1]

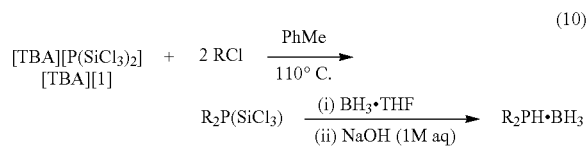
(10)

[TBA][1] can be used to prepare secondary alkyl phosphines by treatment with two or more equivalents of an alkyl chloride in toluene at 110 degrees C. (Eq. 10). Secondary alkyl phosphines can be isolated by protection with borane using $BH_3 \cdot THF$ to give air-stable Lewis-base adducts that are amenable to purification by column chromatography. Existing routes are known to convert secondary alkyl phosphines to a number of other organophosphorus compounds such as trialkylphosphines. See, for example, H. Werner, G Canepa, K. Ilg, J. Wolf, *Organometallics* 19, 4756 (2000), which is incorporated by reference in its entirety.

Preparation of Phosphine from [TBA][1]

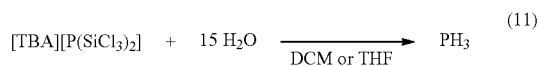
(11)

[TBA][1]

[TBA][1] can be used to prepare phosphine ($PH_3$) by treatment with water (Eq. 11). Phosphine is a highly toxic and flammable gas which therefore presents challenges for storage and transportation. An advantage of the method described hererin is the transportation of a non-volatile solid, which upon treatment with water can be used to generate phosphine on demand.

Industrially, generation of phosphine could be accomplished by the simple addition of water to a solid sample of [TBA][1], avoiding the use of flammable and/or toxic organic solvents. This process would be analogous to phosphine production in the fumigation industry where metal phosphides (predominantly AlP and $Mg_3P_2$, of which combined worldwide production is around 3000 t) are slowly hydrolyzed by atmospheric moisture to generate phosphine gas. See, for example, G Bettermann, W. Krause, G Riess, T. Hofmann, "*Phosphorus Compounds, Inorganic*", *Ullmann's Encyclopedia of Industrial Chemistry* (Wiley-VCH Verlag GmbH & Co. KGaA, Weinheim, Germany, 2000), which is incorporated by reference in its entirety. Phosphine also has applications in small scale laboratory procedures such as in the preparation of indium phosphide quantum dots. See, for example, S. Tamang, C. Lincheneau, Y Hermans, S. Jeong, P. Reiss, *Chem. Mater.* 28, 2491 (2016), which is incorporated by reference in its entirety.

Preparation of the Hexafluorophosphate anion from [TBA][1]

[TBA][1] can be used to prepare the hexafluorophosphate anion, $[PF_6]^-$, by oxidation with a convenient laboratory source of elemental fluorine, for example, $XeF_2$ (Eq. 12). The additional equivalents of xenon difluoride required for this reaction to proceed are likely a result of competitive fluorination of the silicon-chlorine bonds of [1]$^-$, presumably to give silicon tetrafluoride as the other main byproduct. [TBA][$PF_6$] can be isolated as a pure compound by recrystallization from ethanol. As a result of its weakly co-ordinating properties, chemical stability and wide electrochemical window of operation, the hexafluorophosphate anion is used extensively as the anion component of the electrolyte in lithium ion batteries. See, for example, R. Younesi, G M. Veith, P. Johansson, K. Edström, T. Vegge, *Energy Environ. Sci.* 8, 1905 (2015), which is incorporated by reference in its entirety.

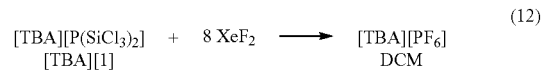
(12)

Industrially, [TBA][$PF_6$] could be made by the reaction of a [TBA][1], metal fluoride salt and a stoichiometric oxidant. The oxidant could be generated electrochemically (e.g. ferrocenium) or by atmospheric oxygen. Alternatively, [TBA][1] could be oxidized to $PCl_5$ by reaction with excess chlorine. Existing routes are known from $PCl_5$ to the hexafluorophosphate anion. See, for example, H. Diskowski, T. Hofmann, "*Phosphorus*", *Ullmann's Encyclopedia of Industrial Chemistry* (Wiley-VCH Verlag GmbH & Co. KGaA, 2000), which is incorporated by reference in its entirety.

Synthesis of Phosphorus-carbon Bonds Directly from Metaphosphate

Synthesis of phosphorus-carbon bonds directly from wet process sources of phosphate (i.e. metaphosphates) would be a breakthrough process for the synthesis of phosphonates, which were discussed above. Such a process would obviate the need for any upfront reduction of phosphate to white phosphorus. The use of organolithium and organomagnesium reagents are already employed in phosphorus-carbon bond forming reactions, typically making use of a phosphorus precursor containing at least one phosphorus-chlorine bond. See, for example, J. Svara, N. Weferling, T. Hofmann, "*Phosphorus Compounds, Organic*", *Ullmann Encyclopedia of Industrial Chemistry* (Wiley-VCH Verlag GmbH & Co. KGaA, Weinheim, Germany, 2006), which is incorporated by reference in its entirety. Another existing synthetic route to access phosphonates is shown below (Eqn. 14), where an organophosphate can be treated with an organolithium reagent to give the corresponding phosphonate. See, for example, M.-P. Teulade, P. Savignac, *Tetrahedron Letters* 28, 405 (1987), which is incorporated by reference in its entirety. However, the preparation of organophosphates relies on phosphorus oxychloride, and thus on white phosphorus from phosphate rock reduction by the thermal process (Eqn. 13).

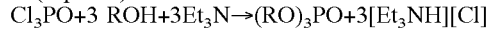

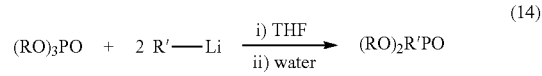
(14)

Synthesis of methylphosphonic acid and dimethylphosphinic acid from trimetaphosphate Treatment of $[TBA]_3[P_3O_9] \cdot 2H_2O$ with a diethyl ether solution of methyl magnesium bromide produces methylphosphonic acid and dimethylphosphinic acid, which were characterized by $^{31}P$ and $^1H$ NMR spectroscopy (Eqn. 15).

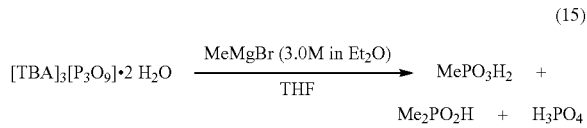
(15)

Selective conditions for the synthesis of an alkylphosphonic acid could be achieved using stoichiometric control, in line with the idealized stoichiometry outlined in Eqn. 16 (R⁻ represents an organomagnesium reagent):

(16)

$$[P_3O_9]^{3-} + 3R^- \xrightarrow{THF} 3 RPO_3^{2-} \xrightarrow{water} 3 RPO_3H_2$$

The advantage of this method for the synthesis of phosphonates and dialkylphosphinic acid derivatives can include:

Use of a wet process phosphate as the phosphorus-containing precursor, which can eliminate the usual requirement for phosphate reduction to white phosphorus by the thermal process.

Use of organomagnesium reagents that already used for the synthesis of phosphonates by current technologies.

Use of orthophosphate as a leaving group, as opposed to chloride. This eliminates the need for species containing phosphorus-chlorine bonds, which are exclusively produced by the action of environmentally hazardous chlorine on phosphorus-containing precursors. The orthophosphate generated can be conveniently dehydrated to re-prepare trimetaphosphate, effectively recycling the unconsumed phosphorus(V) material that is not consumed in the reaction.

The use of organomagnesium reagents, can be less expensive than their organolithium counterparts.

Alternative alkylating reagents are envisioned, using organolithium, organoaluminum or organozinc reagents. The nature of the R group on the alkylating agent can include primary, secondary and tertiary alkyl groups, as well as aromatic groups.

Exchange of chloride for fluoride to give bis(trifluorosilyl)phosphide Bis(trifluorosilyl)phosphide can be prepared by exposing bis(trichlorosilyl)phosphide to a fluoride salt. See, for example:

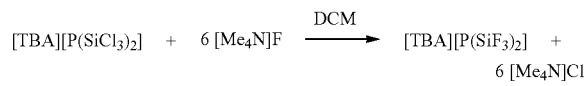

$$[TBA][P(SiCl_3)_2] + 6[Me_4N]F \xrightarrow{DCM} [TBA][P(SiF_3)_2] + 6[Me_4N]Cl$$

Figure 32:
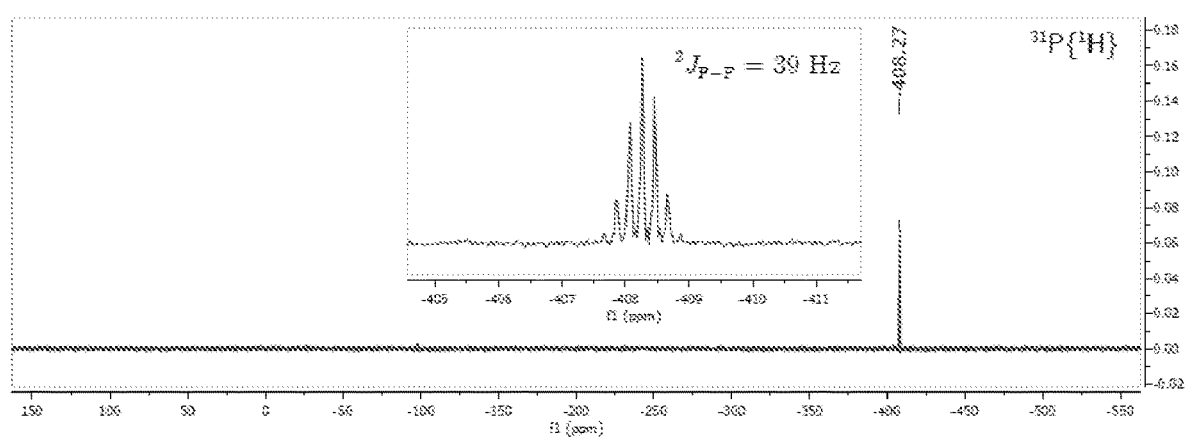
FIG. 32 depicts a $^{31}$P{$^1$H} NMR spectrum of bis(trifluorosilyl)phosphide.

See FIG. 32 for an NMR spectrum of bis(trifluorosilyl)phosphide.

Determination of s-orbital Character: Coordination to W(CO)₅

Bis(trichlorosilyl)phosphide coordination compounds can be prepared. For example, a tungsten compound ([(Cl₃Si)₂PW(CO)₅]⁻) can be prepared as shown:

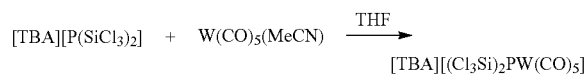

$$[TBA][P(SiCl_3)_2] + W(CO)_5(MeCN) \xrightarrow{THF} [TBA][(Cl_3Si)_2PW(CO)_5]$$

Figure 33:
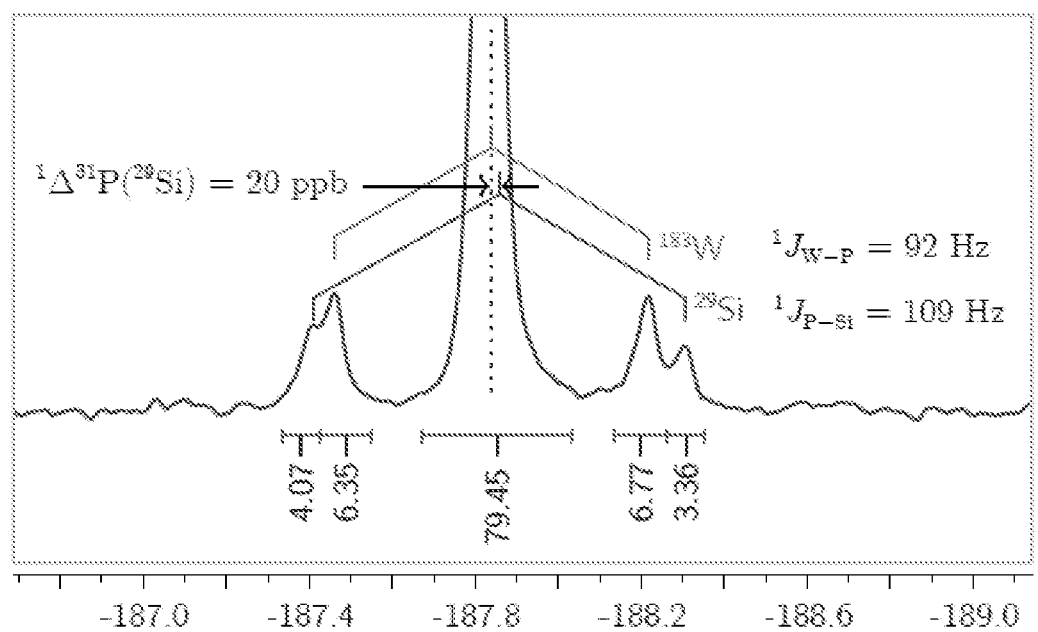
FIG. 33 depicts a $^{31}$P NMR spectrum of ([(Cl$_3$Si)$_2$PW(CO)$_5$]$^-$).

See FIG. 33 for an NMR spectrum of [(Cl₃Si)₂PW(CO)₅]⁻. Other $^1J_{W-P}$ values: PF₃: 485 Hz; PPh₃: 280 Hz; PBu₃: 250 Hz; [P(CF₃)₂]⁻: 103 Hz.

An aluminum compound can be prepared as follows:
[TBA][P(SiCl₃)₂]+Cp*AlCl₂→[TBA][Cp*AlCl₂(P(SiCl₃)₂)]

SiCl₄ elimination as an entryway to metal phosphides

Bis(trichlorosilyl)phosphide can deliver phosphide to a metal with elimincation of SiCL₄, for example, as shown here:
[TBA][P(SiCl₃)₂]+InCl₃→InP+2 SiCl₄+[TBA]Cl Commercial Applications

[TBA][1] can be immediately implemented in the synthesis of alkyl phosphines, dialkylphosphines, hexafluorophosphate and phosphine. A key advantage of [TBA][1] over the existing routes to these compounds is the reduction of phosphate using trichlorosilane, which is already produced in high volumes for the semiconductor industry. See, for example, W. Simmler, "*Silicon Compounds, Inorganic*", *Ullmann's Encyclopedia of Industrial Chemistry* (Wiley-VCH Verlag GmbH & Co. KGaA, Weinheim, Germany, 2000), which is incorporated by reference in its entirety. [TBA][1] is also made under mild conditions, in contrast to P₄. As an illustrative future use of [TBA][1] an intermediate in the synthesis of fosinopril sodium, a FDA approved drug for heart disease, was prepared on a laboratory scale (FIG. 5). See, for example, N. G Anderson, et al., *Org. Process Res. Dev.* 1, 315 (1997), which is incorporated by reference in its entirety.

An additional advantage of the method is the straightforward purification of [TBA][1] by multiple recrystallization. Phosphorus produced by the "thermal method" typically contains about 0.01 wt % arsenic, which is toxic to humans. See, for example, H. Diskowski, T. Hofmann, "*Phosphorus*", *Ullmann's Encyclopedia of Industrial Chemistry* (Wiley-VCH Verlag GmbH & Co. KGaA, 2000); and A. Vahidnia, G van der Voet, F. de Wolff, *Hum. Exp. Toxicol.* 26, 823 (2007), which is incorporated by reference in its entirety. It is virtually impossible to remove arsenic impurities from white phosphorus, since arsenic atoms replaces single phosphorus atoms in the lattice. See, for example, B. M. Cossairt, M.-C. Diawara, C. C. Cummins, *Science* 323, 602 (2009), which is incorporated by reference in its entirety. The formation of [TBA][1] yields highly pure phosphorus-containing products, which would have particularly important uses in the preparation of electronic devices and pharmaceutical products. It is envisioned that arsenic present in the phosphate raw material would be reduced to a compound with different physical properties to those of [TBA][1], allowing it to be separated by standard laboratory and industrial techniques.

[TBA][1] can also be used to prepare high quality bulk indium phosphide (InP) for the electronics industry and InP quantum dots for the digital display and medical industries. See, for example, S. Tamang, C. Lincheneau, Y. Hermans, S. Jeong, P. Reiss, *Chem. Mater.* 28, 2491 (2016), which is incorporated by reference in its entirety. [TBA][1] can also be used in the preparation of triphenylphosphine, PPh₃, an industrially important phosphorus-containing compound used in catalysts for fuel upgrading and also as a reagent in the Wittig reaction, commonly encountered in the synthesis of pharmaceutically relevant compounds. See, for example, J. Svara, N. Weferling, T. Hofmann, "Phosphorus Compounds, Organic", Ullmann's Encyclopedia of Industrial Chemistry (Wiley-VCH Verlag GmbH & Co. KGaA, Weinheim, Germany, 2006), which is incorporated by reference in its entirety.

Other reductants can be used. For example, any silane $H_nSiX_{4-n}$, (where X is a halogen, alkoxy, aryloxy, amido or arylamido substituent) can be used to reduce phosphate materials.

Other phosphorus-containing starting material can be used. Starting with phosphoric acid, in some state of protonation ($H_3PO_4$, $MH_2PO_4$, $M_2HPO_4$, $M_3PO_4$, where M is an alkali metal or organic cation including but not limited to TBA+, PPN+ and TAS+) could give rise to reduction of the phosphoric acid to valuable phosphorus-containing products. Other cyclic metaphosphates of varying ring size (general formula: $[P_nO_{3n}]^{n-}$, where n is 3-6) should also be used as the phosphorus sources, as well as linear metaphosphate chains (e.g. metaphosphoric acid, $(HPO_3)_n$, or its salts). Mineral sources of orthophosphate will also be explored as the phosphorus starting material.

Some of the accessible phosphorus fine chemicals can have a formula selected from the group consisting of: $RP(SiCl_3)H$, $R_2P(SiCl_3)$, $RP(O)(OH)H$, $R_2P(SiCl_3) \cdot BH_3$, $RPO_3H_2$, $R_2P(O)H$, or $R_2P(O)(OH)$.

Figure 6:
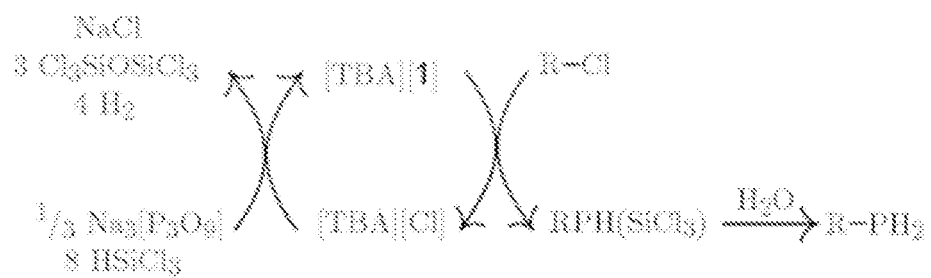
FIG. 6 is a schematic showing use of catalytic tetrabutylammonium chloride for the synthesis of alkyl phosphines, starting from sodium trimetaphosphate.

A process to reduce or eliminate the need for stoichiometric [TBA]+ would also be desirable. This could in principle be achieved by the use of sodium trimetaphosphate with trichlorosilane, using a catalytic amount of [TBA][Cl] as a phase-transfer agent. As [TBA][1] forms in solution, by cation exchange, it could react with a partner such as an alkyl chloride, regenerating [TBA][Cl]. Precipitation of sodium chloride would drive the reaction to completion (FIG. 6).

List of Abbreviations Used
DCM dichloromethane
HPV high production volume
NMR nuclear magnetic resonance
PBTC 2-phosphonobutane-1,2,4-tricarboxylic acid
PPN bis(triphenylphosphoranylidene)ammonium
TAS tris(dimethylamino)sulfonium
TBA tetrabutylammonium
THF tetrahydrofuran Silicon-chlorine bond-functionalization of the bis(trichlorosilylphosphide) anion The bis(trichlorosilyl)phosphide anion reacts with various nucleophiles to furnish Si— Cl bond functionalized products. Examples include tetramethylammonium fluoride (TMAF) and methyllithium, which provide the bis(trifluorosilyl)phosphide anion and tris(trimethylsilyl)phosphine respectively (Eqns 17 and 18):

  (17)

  (18)

Other nucleophiles that can be employed for silicon-chlorine bond functionalization include azide, cyanide, triflate, halides, carbon-based nucleophiles such as Grignard reagents and organolithium reagents, oxygen-based nucleophiles such as alkoxides, and nitrogen-based nucleophiles such as amides.

Tris(trimethyl)phosphine is a useful reagent for preparing phosphide-containing materials such as indium(III) phosphide and nanocrystals. See, S. Tamang, C. Lincheneau, Y. Hermans, S. Jeong, P. Reiss, Chem. Mater. 28, 2491 (2016), which is incorporated by reference in its entirety. It is also a reagent that can be used to prepare phosphorus-carbon bonds. See, S. A. Kosarev, S. J. Collier, Encyclopedia of Reagents for Organic Synthesis, John Wiley & Sons, Ltd, ed. (John Wiley & Sons, Ltd, Chichester, UK, 2011), which is incorporated by reference in its entirety.

Preparation of acylphosphines from [TBA][P(SiCl$_3$)$_3$]

Acylphosphines are primarily used as photoinitiators for polymerization reactions, and feature in a broad range of applications including "coatings, adhesives, inks, optical waveguides, micro-electronics". Their preparation generally relies upon the the reaction of a primary phosphine, $RPH_2$, or their metalated derivatives, $RPH_xM_{2-x}(x=0, 1, 2. M =Li$, Na etc.), with an acyl chloride. It has been argued that this preparative method shows low functional group compatibility. See, L. Gonsalvi, M. Peruzzini, Angew. Chem. Int. Ed. 51, 7895 (2012), which is incorporated by reference in its entirety.

Treatment of [TBA][P(SiCl$_3$)$_2$] with an acyl chloride (ArCOCl) or acyl triflate (ArCOOTf) leads to the formation of mono-, di- and triacylphosphines depending on the stoichiometric ratio of the acyl chloride, along the lines of the following general equations:

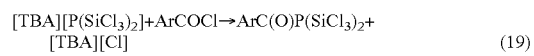  (19)

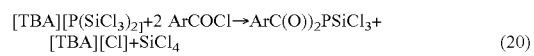  (20)

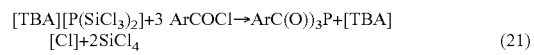  (21)

Preparation of Organophosphates from Phosphate Sources
Background to Organophosphates Organophosphates (OP(OR1)(OR2)(OR3), OP(OR1)(OR2)(OH), OP(OR)(OH)2) are used in a variety of industries, some of which include "cleaning agents and emulsifiers, textile improvers, plasticizers and flameproofing agents for plastics, anticorrosion agents, and extractants in hydrometallurgy." See, J. Svara, N. Weferling, T. Hofmann, "Phosphorus Compounds, Organic", Ullmann's Encyclopedia of Industrial Chemistry, Wiley-VCH Verlag GmbH & Co. KGaA, ed. (Wiley-VCH Verlag GmbH & Co. KGaA, Weinheim, Germany, 2006), which is incorporated by reference in its entirety. They are generally prepared by addition of an alcohol to phosphoryl chloride to give the corresponding organophosphate (Eqn. 6):

  (22)

Other methods include the stoichiometric reaction between an alcohol and phosphoric acid, promoted by acidic or basic catalysts. See, A. Sakakura, M. Katsukawa, K. Ishihara, Angew. Chem. Int. Ed. 119, 1445 (2007), A. Sakakura, M. Katsukawa, K. Ishihara, Org. Lett. 7, 1999 (2005), A. Sakakura, M. Katsukawa, T. Hayashi, K. Ishihara, Green Chem. 9, 1166 (2007), each of which is incorporated by reference in its entirety .This method is effective for the preparation of monoalkylphosphonates, but has rarely been applied for the synthesis of di- and triorganophosphates. An additional method for preparing triorganophosphates involves treating silver phosphate with an alkyl halide. See, F. Weger, Justus Liebigs Ann. Chem. 221, 61 (1883), which is incorporated by reference in its entirety.

Preparation of Organophosphates from Phosphate

Treatment of phosphoric acid, a polyphosphoric acid, a metaphosphate, or an inorganic source of phosphate such as fluorapatite or struvite with an alcohol leads to the formation of an organic phosphate. This reaction can be promoted by acidic conditions, basic conditions, nucleophilic catalysts, dehydrating agents, and heat. Idealized equations leading to the formation of organophosphates are given in Eqns. 23-25.

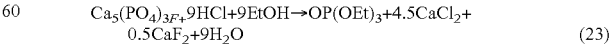  (23)

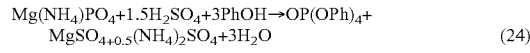  (24)

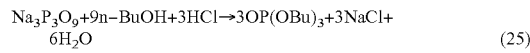  (25)

Preparation of the tris-(o-phenylenedioxy)phosphate anion ($[P(O_2C_6H_4)_3]^-$) from Phosphoric acid In a similar reaction to those described above, the tris-(o-phenylenedioxy)phosphate anion ($[P(O_2C_6H_4)_3]^-$) can be prepared from from catechol and various phosphorus-containing precursors. See, P. W. Siu, D. P. Gates, Organometallics 28, 4491 (2009), which is incorporated by reference in its entirety which is incorporated by reference in its entirety.

Example Reactions are Provided in Eqns 26 and 27:

$$H_3PO_4 + 3H_2O_2C_6H_4 \rightarrow H[P(O_2C_6H_4)_3] + 4H_2O \quad (26)$$

$$Mg(NH_4)PO_4 + 3H_2O_2C_6H_4 + 3HCl \rightarrow H[P(O_2C_6H_4)_3] + MgCl_2 + NH_4Cl + 4H_2O \quad (27)$$

Methods for preparing germanium-carbon and silicon-carbon bonds through an analogous pathway have previously been demonstrated. See, M. Glavinovic, et al., Sci. Adv. 3, e1700149 (2017), and A. Boudin, G Cerveau, C. Chuit, R. J. P. Corriu, C. Reye, Organometallics 7, 1165 (1988), each of which is incorporated by reference in its entirety.

Use of organophosphates in phosphorus-carbon bond-forming reactions

Use of organophosphates to prepare phosphonates

Organophosphates prepared using the conditions described above can be subsequently employed in phosphorus-carbon bond forming reactions. Treatment of an organophosphate with a Grignard or alkyllithium reagent leads to the formation of a phosphonate, which can be hydrolyzed to give the phophonic acid, as described by Eqns. 28 and 29. See, F. Eymery, B. Iorga, P. Savignac, Tetrahedron 55, 13109 (1999), which is incorporated by reference in its entirety.

$$OP(OR)_3 + R'—Mg—X \rightarrow R'PO(OR)_2Cl—Mg—OR \quad (28)$$

$$R'PO(OR)_2 + 2H_2O \rightarrow R'P(O)(OH)_2 + 2HOR \quad (29)$$

Use of the tris-(o-phenylenedioxy)phosphate anion to prepare phosphonates

Along the lines of the reactions described above, the tris-(o-phenylenedioxy)phosphate anion can be used to prepare phosphorus-carbon bonds. Idealized balanced equations leading to the formation of one such carbon-phosphorus bond-containing product is provided in Eqn. 30. Subsequent hydrolysis to give the corresponding phosphonate is given in Eqn. 31.

$$H[P(O_2C_6H_4)_3] + 2R—Mg—Cl \rightarrow RP(O_2C_6H_4)_2 + RH + MgCl + MgO_2C_6H_4 \quad (30)$$

$$RP(O_2C_6H_4)_2 + 3H_2O \rightarrow RPO(OH)_2 + 2H_2O_2C_6H_4 \quad (31)$$

Use of Organophosphates to Prepare Primary Phosphines

Organophosphates can be employed as the phosphorus-containing starting materials for the preparation of primary phosphines, using the procedure of trichlorosilane-promoted phosphorusalkylation. A balanced equation for the general reaction is provided in Eqn. 32:

$$OP(OR)_3 + 7HSiCl_3 + RCl \rightarrow RP(SiCl_3)H + 3ROSiCl_3 + O(SiCl_3)_2 + SiCl_4 + 3H_2 \quad (32)$$

Hydrolysis of the phosphorus-silicon bond using water provides the corresponding primary phosphine:

$$RP(SiCl_3)H + H_2O \rightarrow RPH_2 + HOSiCl_3 \quad (33)$$

Preparation of Phosporyl Chloride ($OPCl_3$) from Phosphoric Acid

Current Preparation and Uses of Phosphoryl Chloride

Phosphoryl chloride is prepared by the reaction of phosphorus(III) chloride with oxygen. Phosphorus(III) chloride is itself derived from white phosphorus; therefore a route to phosphoryl chloride that bypasses the high energy requirements of the thermal process would be beneficial. Phosphoryl chloride can be used to prepare phosphate esters by treatment with an alcohol. It can also be used to prepare phosphorylated biologically relevant molecules. See, G Bettermann, W. Krause, G Riess, T. Hofmann, "Phosphorus Compounds, Inorganic", Ullmann's Encyclopedia of Industrial Chemistry (Wiley-VCH Verlag GmbH & Co. KGaA, Weinheim, Germany, 2000), and T. Kovacs, L. Otvos, Tetrahedron Lett. 29, 4525 (1988), each of which is incorporated by reference in its entirety.

Preparation of Phosphoryl Chloride from Phosphoric Acid and Organophosphates

Treatment of phosphoric acid, a polyphosphoric acid or an organophosphate with hydrogen chloride, an element oxy chloride, or an element chloride provides phosphoryl chloride. For example, the element oxychloride can be thionyl chloride and the element chloride can be silicon(IV) chloride. Example reactions are provided below in Eqns. 34-36.

$$H_3PO_4 + 1.5SiCl_4 \rightarrow OPCl_3 + 3HCl + 1.5SiO_2 \quad (35)$$

$$OP(OMe)_3 + 3SOCl_2 \rightarrow OPCl_3 + 3MeCl + 3SO_2 \quad (35)$$

$$OP(OEt)_3 + 3HCl \rightarrow OPCl \rightarrow OPCl_3 + 3HOEt \quad (36)$$

Previous reports on the formation of phosphoryl chloride from phosphoric acid using phosphorus(V) chloride have been demonstrated. (15) Additionally, silica and silicate-containing compounds have been converted to alkoxysilanes using acidic alcohol solutions. (16) Additionally, alkoxysilanes have been converted to silicon (IV) chloride using either hydrogen chloride (17) or thionyl chloride (18). See, N. Zhang, J. E. Casida, J. Org. Chem. 66, 327 (2001), G B. Goodwin, M. E. Kenney, Inorg. Chem. 29, 1216 (1990), J. M. Roberts, D. V. Eldred, D. E. Katsoulis, Ind. Eng. Chem. Res. 55, 1813 (2016), and J. M. Roberts, J. L. Placke, D. V. Eldred, D. E. Katsoulis, Ind. Eng. Chem. Res. 56, 11652 (2017), each of which is incorporated by reference in its entirety.

Experimental Details

Synthetic Ddetails and Characterization of Products

General Methods

All manipulations were performed in a Vacuum Atmospheres model MO-40M glovebox under an inert atmosphere of purified $N_2$ or using standard Schlenk techniques. All solvents were obtained anhydrous and oxygen-free by bubble degassing (argon) and purification by passing through columns of alumina and Q5. See, for example, A. B. Pangborn, M. A. Giardello, R. H. Grubbs, R. K. Rosen, F. J. Timmers, Organometallics 15, 1518 (1996), which is incorporated by reference in its entirety. Once collected, solvents were stored over 20 wt % of activated 4 Å molecular sieves inside the glovebox. See, for example, D. B. G Williams, M. Lawton, J. Org. Chem. 75, 8351 (2010), which is incorporated by reference in its entirety. Trisodium trimetaphosphate and trichlorosilane were purchased from Millipore-Sigma. 4-Phenyl-l-chlorobutane (TCI) was degassed three times by the freeze-pump-thaw method and placed over activated 4 Å molecular sieves for 48 h prior to use. Borane (1.0 M in THF, Millipore-Sigma) was stored in a fridge at −10 degrees C. Dichloromethane-d2, benzene-d6 and chloroform-d were purchased from Cambridge Isotope Labs and were degassed by the freeze-pump-thaw method and stored over molecular sieves for at least 48 h prior to use. Celite 435 (EM Science) and basic alumina (Millipore-Sigma) were dried by heating to 200 degrees C. under dynamic vacuum for at least 48 h prior to use. Silica gel 60 was purchased from EMD. All glassware was oven-dried for at least 6 h prior to use, at temperatures greater than 150 degrees C. NMR spectra were obtained on Varian 300 MHz, Bruker Avance 400 MHz or JEOL 500 MHz instruments. $^1$H and $^{13}$C NMR spectra were referenced to residual dichloromethane-d2 ($^1$H=5.32 ppm, $^{13}$C=54.0 ppm), benzene-d6 ($^1$H=7.16 ppm, $^{13}$C=128.06 ppm) or chloroform-d ($^1$H=7.26, $^{13}$C=77.16 ppm). $^{31}$P NMR spectra were referenced externally to 85% $H_3PO_4$(0 ppm). IR spectra were collected on a Bruker Tensor 37 FT-IR spectrometer. Elemental combustion analyses were performed by Robertson Microlit Laboratories. ESI-Mass Spectrometry was performed using a Waters Q-TOF Micro Mass Spectrometer. The steel pressure reactor was fabricated by the MIT Central Machine Shop and the valves, adaptors and nuts were purchased from Swagelok.

Synthesis of $[TBA]_3[P_3O_9]\cdot 2H_2O$ $[TBA]_3[P_3O_9]\cdot 2H_2O$ was prepared using a modified literature procedure. See, for example, C. J. Besecker, V. W. Day, W. G Klemperer, Organometallics 4, 564 (1985), which is incorporated by reference in its entirety. Dowex 50WX8 Hydrogen form (1.7 meq/mL) was added to a 200 mL beaker containing deionized water (50 mL) until a wetted bed volume of 96 mL was achieved. The slurry was transferred to a 1000 mL Erlenmeyer flask, and the volume of the solution increased to 500 mL. [TBA][OH] (40 wt % in water, 105 mL, 162 mmol) was measured into a beaker, then transferred to the flask containing the Dowex ion exchange resin. The final volume was increased to 1000 mL using deionized water, and left to stir at 23 degrees C. for 24 h. The slurry was loaded into a column (60 cm×2 cm) which was washed with additional deionized water (160 mL), using a positive pressure of air to increase the flow rate. Sodium trimetaphosphate (10.0 g, 32.7 mmol) was dissolved in deionized water (500 mL) and the solution was added to the ion exchange column, and allowed to flow through at a rate of 2 mL/min. The first 100 mL of eluent was discarded, and the rest collected in a 1000 mL Erlenmeyer flask. The column was rinsed with additional deionized water (100 mL), maintaining a flow rate of 2 mL/min. Water was removed from the solution using a rotary evaporator, to give a clear viscous oil, which became a waxy solid after an additional hour on the rotary evaporator. The solids were washed with diethyl ether (3×90 mL) by adding ether, breaking up the solids with a spatula, then decanting off the clear diethyl ether solution. The solids obtained were dried for 18 h on a vacuum line at 45 degrees C. The material obtained was dissolved in 1,2-dichloroethane (125 mL) and the solution was passed through a frit (fine porosity, 30 mL) to remove any undissolved material. Diethyl ether (700 mL) was added to the clear solution to give a fine precipitate, which was washed with diethyl ether (3×90 mL) by stirring for 5 minutes then decanting off the clear diethyl ether. The obtained solids were transferred to a Schlenk flask, where they were dried at 45 degrees C. for 24 h before being isolated in the glovebox as a free-flowing white powder (24.9 g, 24.9 mmol, 76% yield). 1 H NMR (300 MHz, $CD_2Cl_2$, δ) 4.30 (s), 3.41-3.23 (m, 2H), 1.64 (m, 2H), 1.45 (m, 2H), 0.99 (t, 7Hz, 3H). $^{31}P\{^1H\}$ NMR (121 MHz, $CD_2Cl_2$, δ)−19.77 (s).

Synthesis of $[TBA][P(SiCl_3)_2]$

Caution: $[TBA][P(SiCl_3)_2]$ releases toxic phosphine gas ($PH_3$) upon exposure to water. The preparation of this compound generates amounts of volatile dichlorosilane, chlorosilane and hydrogen, as determined by NMR spectroscopy, so the preparation should be carried out behind a blast shield. Reactor size is important to allow enough head space for volatile products and to avoid excessive pressure build-up.

In a Glass Schlenk Flask

In the glovebox, $[TBA]_3[P_3O_9]\cdot 2H_2O$(1.0 g, 1.0 mmol) was transferred to a thick-walled 100 mL Schlenk bomb. The flask was removed from the glovebox and connected to a Schlenk line in the fume hood. The nitrogen manifold of the Schlenk line was equipped with an oil-bubbler, followed by a water-bubbler in series, which was present to scrub any moisture-reactive gases that were released from the flask. Under a flow of nitrogen, trichlorosilane (10.0 mL, 99.2 mmol) was added to the flask using a syringe, directly from the stock bottle of trichlorosilane which was equipped with a Sure/Seal™. The addition of trichlorosilane caused an exothermic reaction with bubbling, so the flask was left open to the nitrogen manifold for 20 min after the initial addition. The flask was sealed then heated with stirring to 65 degrees C. for 3 h. It was then removed from the oil bath and cooled to 23 degrees C. before being opened to the nitrogen manifold of the Schlenk line to equalize the pressure inside the reaction flask. The flask was sealed and placed back in the oil bath at 65 degrees C. for 240 h. Every 24 h, the pressure inside the flask was equalized as described above. After 240 h, the flask was removed from the oil bath, and allowed to cool to 23 degrees C. Volatile materials were removed under vacuum, and the material was dried in vacuo for an additional 2 h. The flask was brought inside the glovebox, and the material was dissolved in THF (20 mL) to give a cloudy solution. The solution was passed through Celite (3 cm bed) in frit (fine porosity, 15 mL). The Celite was washed with additional THF (2×10 mL) and all volatiles were removed from the filtrate under reduced pressure over the course of 8 h to give a tacky white oil. The oil was triturated with diethyl ether (3×5 mL) to give a slightly more solid product. The paste was dissolved DCM (4 mL) and passed through a piece of filter paper in a pipette into a 20 mL scintillation vial. Diethyl ether (16 mL) was added, causing an immediate white precipitate to form. The vial was taped around the seal using electrical tape and placed in a freezer at −35 degrees C. overnight. The solids that formed were broken up with a spatula and collected on a frit (fine porosity, 15 mL), and were washed with pentane (3×10 mL, −35 degrees C.) before being dried to constant mass to give a free-flowing white powder (1.150 g, 2.1 mmol, 70.7% yield). Elem. Anal. Calcd. (found) for $C_{16}H_{36}Cl_6N_1P_1Si_1$: C 35.44(36.03), H6.69(6.70), N 2.58(2.83). $^1$H NMR (500 MHz, $CD_2Cl_2$, δ) 3.24-3.17 (m, 2H), 1.68-1.58 (m, 2H), 1.42 (m, J=7.3 Hz, 2H), 1.00 (t, J=7.3 Hz, 3H). $^{13}$C NMR (126 MHz, $CD_2Cl_2$, δ) 59.45, 24.47, 20.21, 13.91. $^{31}$P NMR (203 MHz, $CD_2Cl_2$, δ)−171.7 (s, $^1J_{P\text{-}Si}$=156 Hz). $^{29}$Si NMR (99 MHz, $CD_2Cl_2$, δ) 11.8 (d, $^1J_{P\text{-}Si}$=156 Hz).

In a Steel Pressure Reactor

Figure 7:
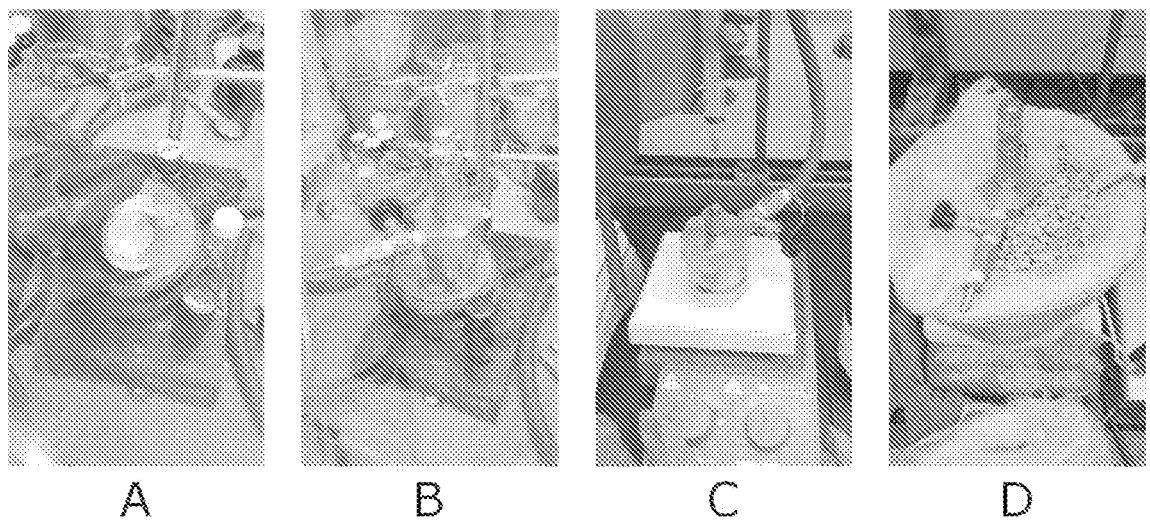
FIG. 7 depicts A: $[TBA]_3[P_3O_9](H_2O)_2$ being loaded into the steel reactor inside the glovebox; B: The steel pressure reactor sealed inside glovebox; C: Process of adding trichlorosilane to the steel reactor under a flow of nitrogen on the Schlenk line; and. D: The steel reactor in a heating mantle filled with aluminum shot.

In the glovebox, $[TBA]_3[P_3O_9]\cdot 2H_2O$ (1.0 g, 1.0 mmol) was transferred to a 25 mL steel pressure reactor, equipped with a needle valve and relief valve. See, FIG. 7. The reactor was removed from the glovebox and was connected to a Schlenk line in the fume hood. Under a flow of nitrogen, trichlorosilane (10.0 mL, 99.2 mmol) was added to the flask using a syringe, directly from the stock bottle of trichlorosilane which was equipped with a Sure/Seal™. The reactor was heated to 110 degrees C. in a heating mantle filled with aluminum shot for 72 h behind a blast shield. The reactor was then allowed to cool to 23 degrees C. over the course of 2 h. The needle valve was opened to an oil bubbler, followed by a water bubbler in series to equalize the pressure inside the reactor. The reactor was removed from behind the blast shield and volatile material was removed on a Schlenk line. The reactor was pumped into the glovebox, and the crude material subjected to the same work-up as detailed in section 8.1.3.1 to give [TBA][1] as a free-flowing white powder (1060 mg, 1.96 mmol, 65.2% yield).

Synthesis and Quantification of $PH_3$ from [TBA][P(SiCl$_3$)$_2$]

Figure 8:
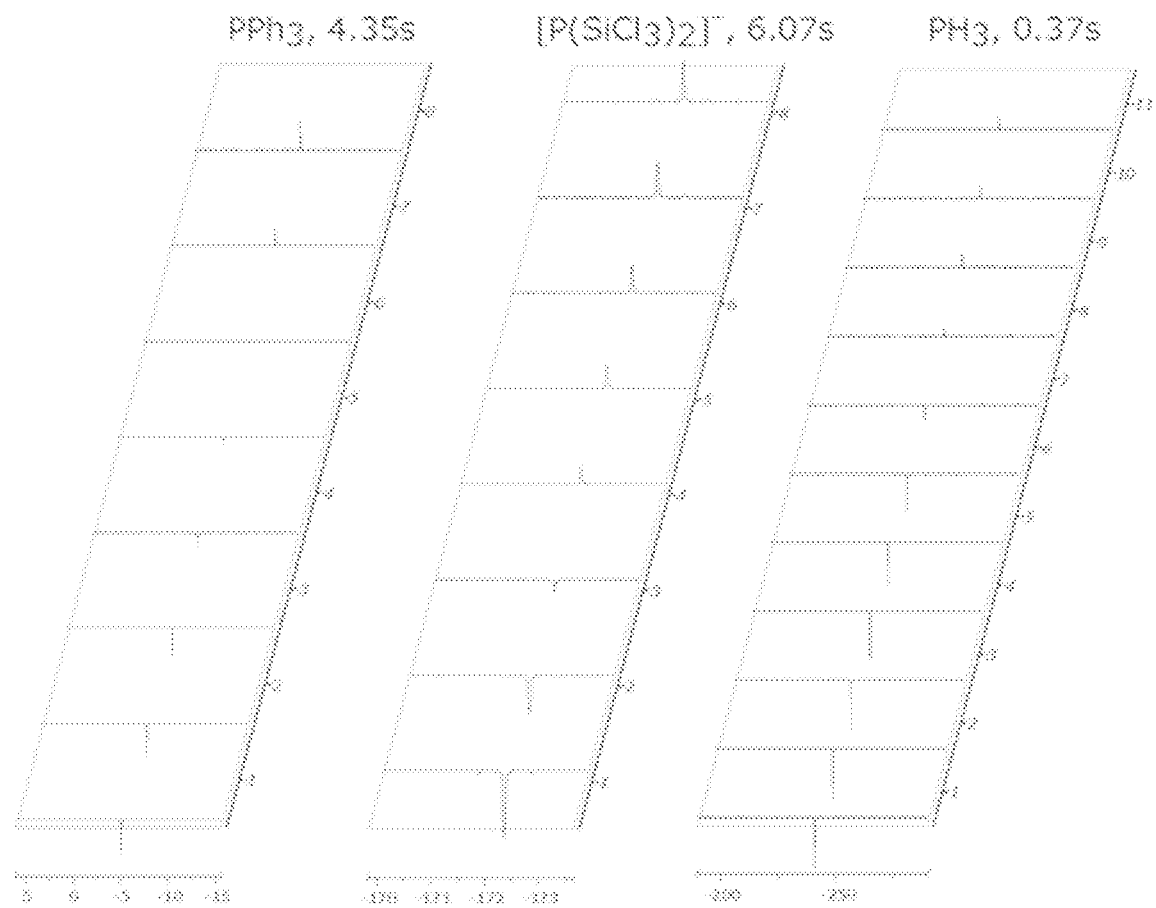
FIG. 8 depicts $^{31}P$ NMR spectra of the species studied by the inversion recovery experiment. The times at the top of the figure correspond to the T1 time for each of the species.
Figure 9:
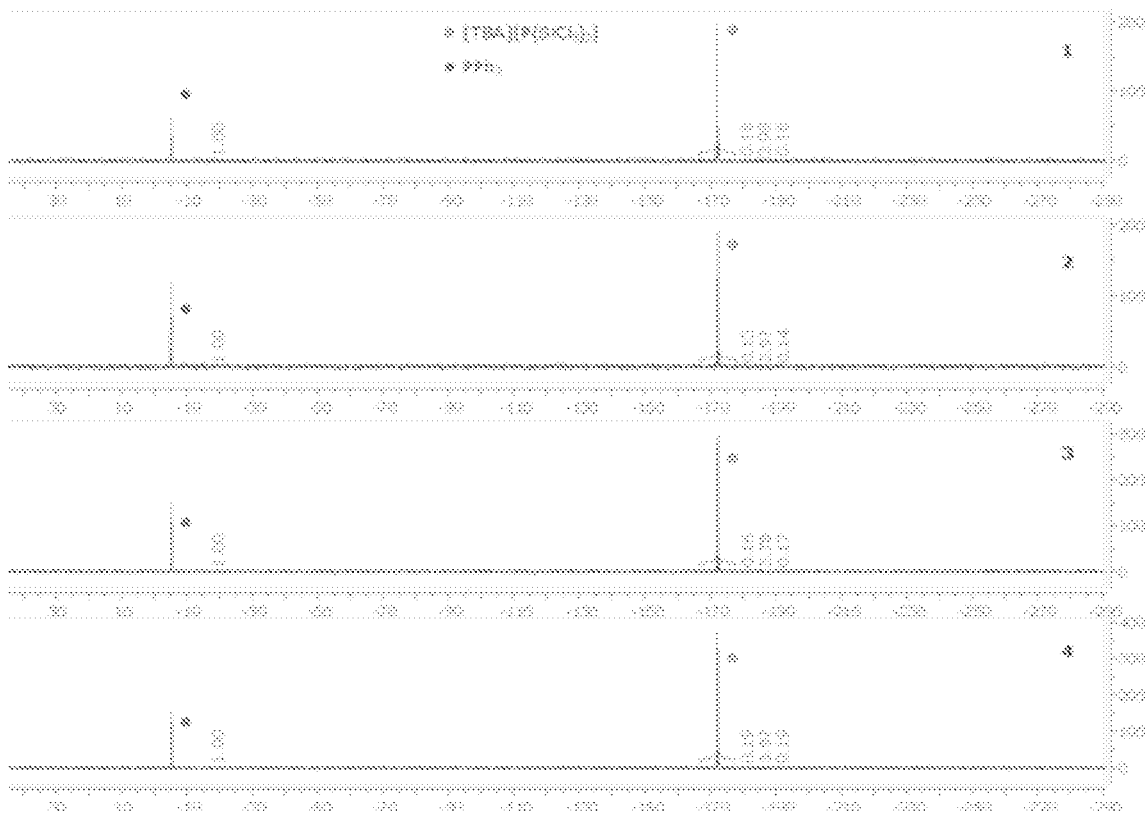
FIG. 9 depicts quantitative $^{31}P$ NMR spectra of the four reactions before addition of water.
Figure 10:
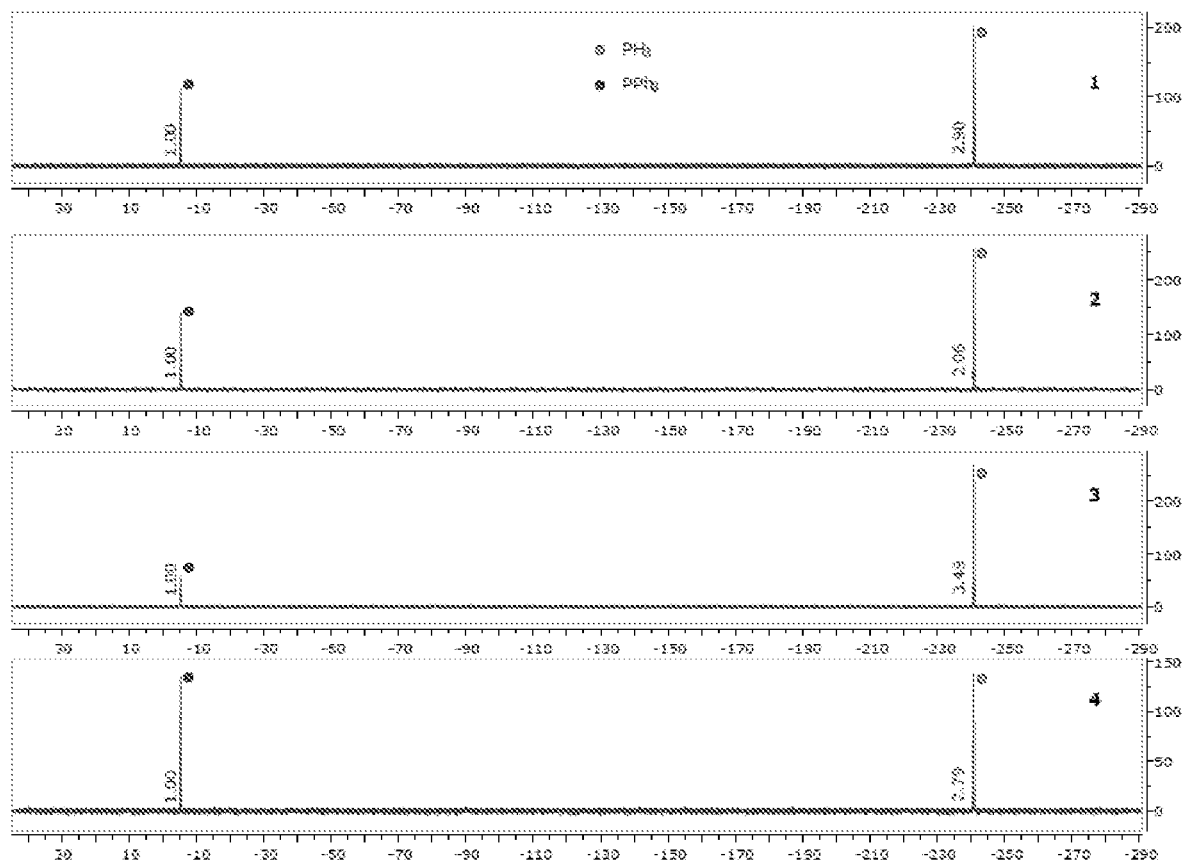
FIG. 10 depicts quantitative $^{31}P$ NMR spectra of the four reactions after addition of water.

This experiment was carried out in quadruplicate. Capillaries for quantitative $^{31}$P NMR spectroscopy were prepared by dissolving Cr(acac)$_3$ (10.0 mg, 0.03 mmol) and triphenylphosphine (270 mg, 1.03 mmol) in C$_6$D$_6$ (2.0 mL). The purpose of the Cr(acac)$_3$ was to act as a paramagnetic relaxation agent. This stock solution (70 μL) was transferred to a capillary which was then flame sealed. In the glovebox, [TBA][1] (100 mg, 0.18 mmol) was weighed into a vial and dissolved in DCM (0.5 mL). The solution was pipetted into a JY-NMR tube containing the capillary. The T1 or triphenylphosphine and [TBA] [1] were measured (Bruker 400) to be 4.35 s and 6.07 s respectively using the inversion recovery experiment. Quantitative $^{31}$P NMR spectra were acquired (8 transients) using a d1 of ≥5*T1, which was chosen to guarantee integration accuracy of 1%. The solutions were frozen in liquid nitrogen, and degassed water (50 μL) was added by microsyringe under a flow of nitrogen. The tubes were sealed again and allowed to warm to 23 degrees C. The T1 of the phosphine produced by the reaction was measured using the inversion recovery method. Quantitative $^{31}$P NMR spectra were acquired (8 transients) using a d1 of ≥5*T1. Integration of peaks relative to triphenylphosphine were used to calculate yield (≥63%, Table 1). See, FIGS. 8, 9, and 10.

TABLE 1

Integration of species relative to PPh3 for each of the four experimental runs Phosphide (%$^{29}$Si) PH$_3$ Yield

| Run | Phosphide (%$^{29}$Si) | PH$_3$ | Yield |
|---|---|---|---|
| 1 | 4.34 (8%) | 2.90 | 67% |
| 2 | 3.24 (8%) | 2.06 | 63% |
| 3 | 4.11 (8%) | 3.49 | 85% |
| 4 | 4.35 (9%) | 2.79 | 64% |

Synthesis of [TBA][PF$_6$] from [TBA][P(SiCl$_3$)$_2$]

Figure 11:
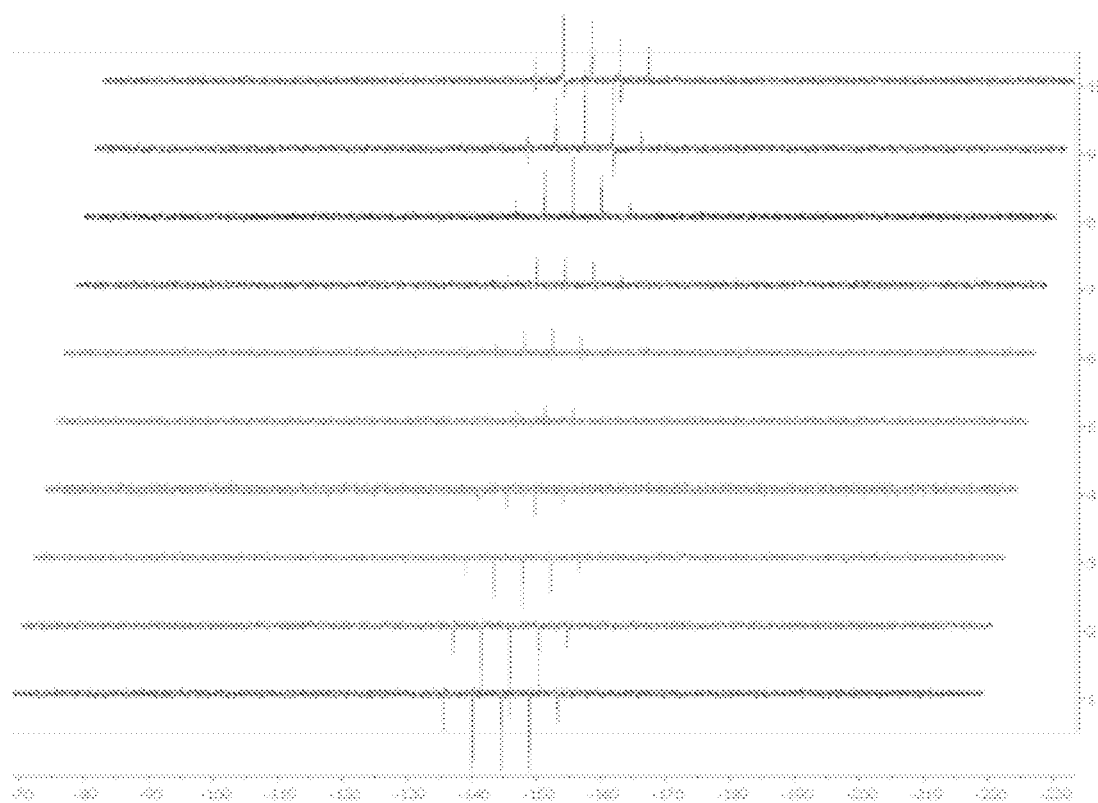
FIG. 11 depicts array of spectra from the measurement of the T1 of $[PF_6]^-$ by the inversion recovery method.
Figure 12:
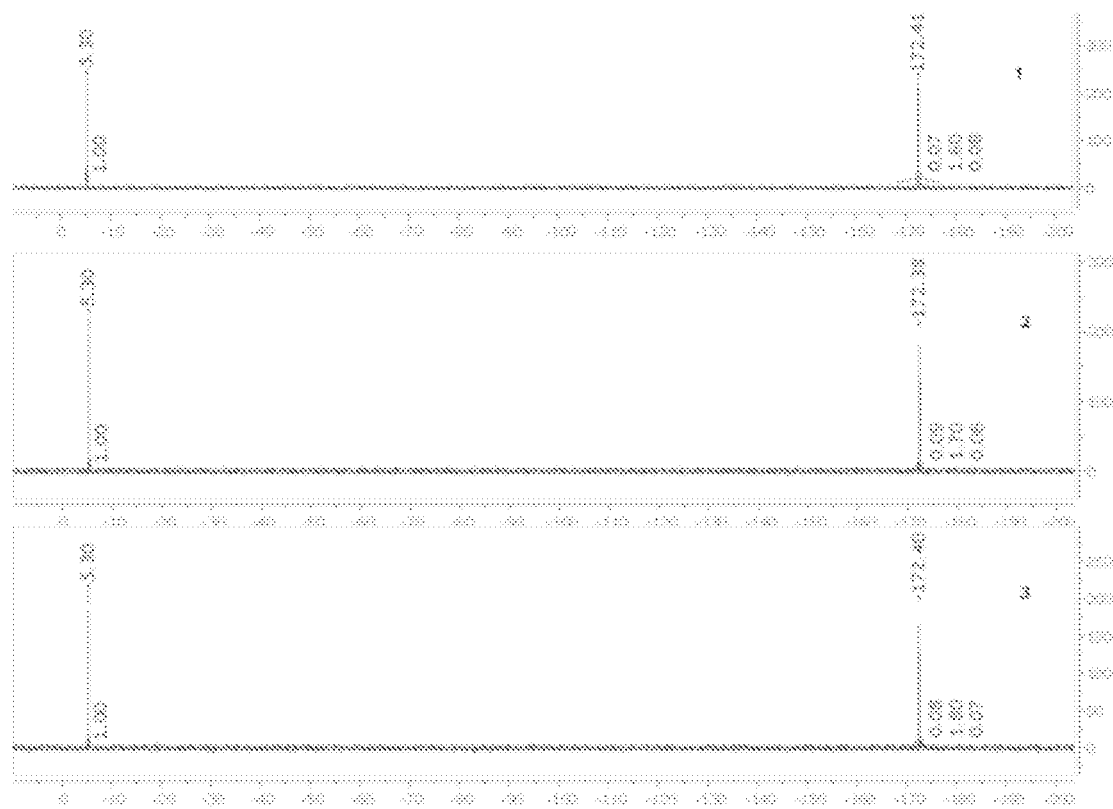
FIG. 12 depicts $^{31}P$ NMR spectra of the solutions before addition of xenon difluoride.
Figure 13:
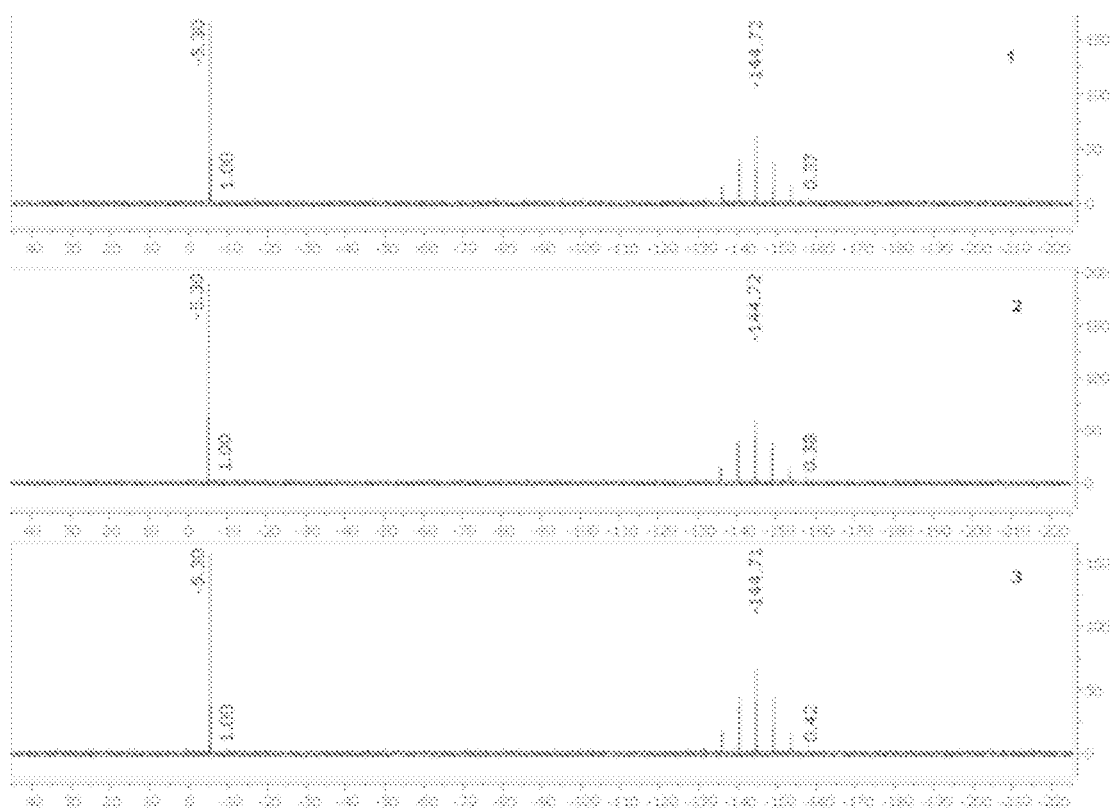
FIG. 13 depicts $^{31}P$ NMR spectra of the solutions after the addition of xenon difluoride.

In the glovebox, [TBA][1] (108 mg, 0.2 mmol) was weighed into a vial containing a stir bar. DCM (2 mL) was added to dissolve the material. Separately, xenon difluoride (270 mg, 1.6 mmol) was weighed into a vial and dissolved in DCM (2 mL). Both solutions were placed in the glovebox coldwell until frozen. Once removed and upon thawing, the solution of xenon difluoride was added dropwise to the stirring solution of [TBA][1]. The reaction was stirred for 1 h, then removed from the glovebox and volatile material removed under vacuum. The yield was obtained by quantitative $^{31}$P NMR spectroscopy. In the glovebox, [TBA][1] (30 mg, 0.056 mmol) was weighed into a JY-NMR tube and dissolved in DCM (0.5 mL). Capillaries for quantitative $^{31}$P NMR spectroscopy were prepared as described in Section 8.1.4. The capillary was inserted into the NMR tube and the integration of the [TBA][1] resonance measured relative to the triphenylphosphine resonance. The NMR tubes were pumped back into the glovebox and xenon difluoride (75 mg, 0.44 mmol) was slowly added to the tube (caution: gas evolution). The tubes were left open to the glovebox atmosphere for thirty minutes to allow any gases produced to escape before being sealed. The T1 of the [PF$_6$]$^-$ anion was measured using the inversion recovery method, and was found to be 5.12 s. Quantitative spectra were acquired using a d1 of ≥5*T1 and using 8 transients. Signals were integrated relative to the triphenylphosphine resonance. The average yield was found to be 68% by this method (Table 2). See FIGS. 11, 12 and 13.

TABLE 2

Integration of species relative to PPh$_3$ for each of the three experimental runs

| Run | Phosphide (%$^{29}$Si) | [PF$_6$]$^-$ | Yield |
|---|---|---|---|
| 1 | 1.75 (9%) | 1.18 | 68% |
| 2 | 1.85 (8%) | 1.21 | 66% |
| 3 | 1.95 (8%) | 1.34 | 69% |

Synthesis of PhCH$_2$CH$_2$CH$_2$CH$_2$PH$_2$ From [TBA][P(SiCl$_3$)$_2$]

In the glovebox, [TBA][P(SiCl$_3$)$_2$] (50 mg, 0.09 mmol) was weighed into a JY-NMR tube. 4-Phenyl-1-chlorobutane (309 mg, 1.83 mmol) was added by pipette. The tube was sealed and removed from the glovebox. On the Schlenk line, trichlorosilane (0.3 mL, 2.97 mmol) was added by syringe under a flow of nitrogen. The tube was sealed and heated to 50 degrees C. behind a blast shield for 144 h. $^{31}$P NMR spectroscopy showed alkylsilylphosphine Ph(CH$_2$)$_4$PH(SiCl$_3$) as the major product, as well as some [TBA][1] and primary phosphine Ph(CH$_2$)$_4$PH$_2$. Volatile material was removed under vacuum and the residue obtained was taken up in DCM (5 mL). The resulting solution was passed through a short column of basic alumina, which converts the P—SiCl 3 to a P—H bond, to give the desired primary phosphine as a colorless oil (3 mg, 0.018 mmol, 20% yield). Alkylsilylphosphine, Ph(CH$_2$)$_4$PH(SiCl$_3$): $^{31}$P{$^1$H} NMR (203 MHz, HSiCl$_3$, δ)-130.25 (s, $^1J_{P-Si}$=68 Hz). $^{31}$P NMR (203 MHz, HSiCl$_3$, δ)-130.25 (dm, $^1J_{P-H}$=202 Hz). Alkylphosphine, Ph(CH$_2$)$_4$PH$_2$: $^{31}$P{$^1$H} NMR (203 MHz, HSiCl$_3$, δ) -140.44 (s). $^{31}$P NMR (203 MHz, HSiCl$_3$, δ) -140.44 (dm, $^1J_{P-H}$=187 Hz).

From [TBA]$_3$[P$_3$O$_9$]·2H$_2$O

In the glovebox, [TBA]$_3$[P$_3$O$_9$]·2H$_2$O (1.0 g, 1.0 mmol) was weighed into a 25 mL steel pressure reactor containing a Teflon coated stir bar. 4-Phenyl-1-chlorobutane (338 mg, 2.0 mmol) was weighed into the reactor, which was then sealed using Teflon tape on the threading, and brought outside the glovebox. The reactor was connected to a Schlenk line and trichlorosilane (10.0 mL, 99.2 mmol) was added under a flow of nitrogen. The reactor was heated to 130 degrees C. with stirring behind a blast shield for 96 h, before being allowed to cool to 23 degrees C. over the course of 2 h. Volatile material was removed under vacuum for 2 h, and the reactor was pumped into the glovebox. Analysis of the crude material by $^{31}$P NMR spectroscopy showed alkylsilylphosphine Ph(CH$_2$)$_4$PH(SiCl$_3$) and [TBA][1] as the major species in solution. The material was dissolved in DCM (15 mL) in a vial, and basic alumina (8.0 g) was added to form a slurry. The slurry was stirred for 2 h, then the solution filtered through basic alumina (2 cm bed) in a frit (fine porosity, 15 mL). The frit was washed with DCM (3×10 mL) and the combined washings were dried in vacuo to give white oily solids and a clear oil. The material obtained was slurried in pentane (10 mL) and the solution passed through basic alumina (2 cm) in a pipette plug. Volatile material was removed from filtrate under vacuum to give a cloudy colorless oil. The oil was purified by trap-to-trap distillation under static vacuum. An oil bath at 60 degrees C. was used to heat the crude material side and dry ice/acetone bath at −78 degrees C. was used to condense product on the collection side. The product was washed from the distillation apparatus using pentane (10 mL), then dried to constant mass under vacuum to give a colorless oil (214 mg, 1.28 mmol, 64% yield). 1 EINMR (300 MHz, $CDCl_3$, δ) 7.37-7.10 (m, 5H), 2.69 (dt, $^1J_{P-H}$=195, $^3J$=7 Hz, 2H), 2.62(t, 7 Hz, 2H), 1.77-1.63 (m, 2H), 1.63-1.42 (m, 4H). $^{31}P\{^1\}$NMR (121 MHz, $CDCl_3$, δ)-136.22 (s). $^{31}P$ NMR (121 MHz, $CDCl_3$, δ)-136.22 (tm, $^1J_{P-H}$=187 Hz).

Synthesis of $(PhCH_2CH_2CH_2CH_2)_2PH \cdot BH_3$

In the glovebox, $[TBA][P(SiCl_3)_2]$ (1.084 g, 2.0 mmol) was weighed into a 100 mL Schlenk flask. 1-Chloro-4-phenylbutane (1.69 g, 10.0 mol) was weighed into a vial, and added to the Schlenk flask using a pipette. The vial used to weigh the alkyl chloride was washed with toluene (2×4 mL) which was added to the Schlenk flask. The flask was sealed and placed in a preheated oil bath at 105 degrees C. for 108 h. After this time, it was removed and placed in an ice bath and connected to a Schlenk line. After cooling to 0 degrees C., a THF solution of $BH_3$(1.0 M, 7.0 mL, 7.0 mmol) was added by syringe to the flask which was then stirred for one hour at 0 degrees followed by one hour at 23 degrees C. The product was worked-up using a modified literature procedure for the isolation of other secondary alkylphosphine-borane compounds. See, for example, G Baccolini, C. Boga, M. Mazzacurati, F. Sangirardi, *Org. Lett.* 8, 1677 (2006), which is incorporated by reference in its entirety. The reaction solution was carefully added to an aqueous sodium hydroxide solution (1.0 M, 80 mL, caution: exothermic) and once the addition was complete the mixture was stirred for 2 h. DCM (30 mL) was added to the mixture and stirred for an additional twenty minutes. The organic layer was separated using a separatory funnel and the aqueous portion extracted with DCM (3×30 mL). The organic layers were combined and dried over $Mg_2SO_4$, then collected by filtration through a frit (fine porosity, 15 mL) into a round bottom flask (200 mL). Volatile material was removed under reduced pressure on the Schlenk line to give a colorless oil. The crude material was purified on silica gel using hexane/EtOAc (95:5) as the eluent to give a colorless oil (120 mg, 0.38 mmol, 19% yield). $^1h$ NMR (500 MHz, $CDCl_3$, δ) 7.52-6.96 (m, 10H), 4.54 (dm, $^1J_{P-H}$=355.9, 1H), 2.81-2.47 (m, 4H), 1.90-1.41 (m, 12H), 0.43 (m, 3H). $^{13}C$ NMR (126 MHz, $CDCl_3$, δ) 141.77, 128.50, 128.44, 126.03, 35.42, 32.50 (d, $^nJ_{P-C}$=11.2 Hz), 24.11, 20.40 (d, $^nJ_{P-C}$=34.81 Hz). $^{31}P\{^1H\}$ NMR (203 MHz, $CDCl_3$, δ)-8.13 (d, $^1J_{P-B}$=70.0 Hz). $^{31}P$ NMR (203 MHz, $CDCl_3$, δ)-8.13 (d, $^1J_{P-H}$=355.9 Hz). $^{11}B$ NMR (161 MHz, $CDCl_3$, δ)-42.41 (d, J=52.5 Hz).

X-ray Diffraction Studies of [TBA][1]

Diffraction-quality, colorless crystals were grown by dissolving $[TBA][P(SiCl_3)_2]$(300 mg, 0.55 mmol) in DCM (1 mL), followed by addition of diethyl ether (2 mL) to produce a white precipitate. The resultant mixture was stored in the freezer (with no filtration step) at −35 degrees C. for 48 h. A single crystal was selected under a microscope and mounted in hydrocarbon oil on a nylon loop. Low-temperature (100 K) data were collected on a Bruker-AXS X8 Kappa Duo diffractometer coupled to a Smart Apex2 CCD detector with Mo K radiation (=0.71073 A) with φ-and ω-scans. A semi-empirical absorption correction was applied to the diffraction data using SADABS. The structure was solved by direct methods using SHELXT and refined against $F_2$on all data by full-matrix least squares with SheIXle. See, for example, G. M. Sheldrick, *Acta Crystallogr, Sect. A: Found. Adv.* 71, 3 (2015); and C. B. Hubschle, G. M. Sheldrick, B. Dittrich, *J. Appl. Crystallogr.* 44, 1281 (2011), which is incorporated by reference in its entirety.

The compound crystallizes with two molecules in the asymmetric unit. One of the tetrabutylammonium cations was disordered; the disorder was treated with a simple model to restrain equivalent carbon—carbon bonds to be the same (SAME command). One of the bis(trichlorosilylphosphide) anions was disordered over two sites; this disorder was modeled as a major and minor component. The other bis(trichlorosilyl)phosphide anion was not disordered. The two disordered anions were constrained to be equivalent, while the third was freely refined. Similarity restraints (SIMU command) were applied to the entire structure.

Figure 14:
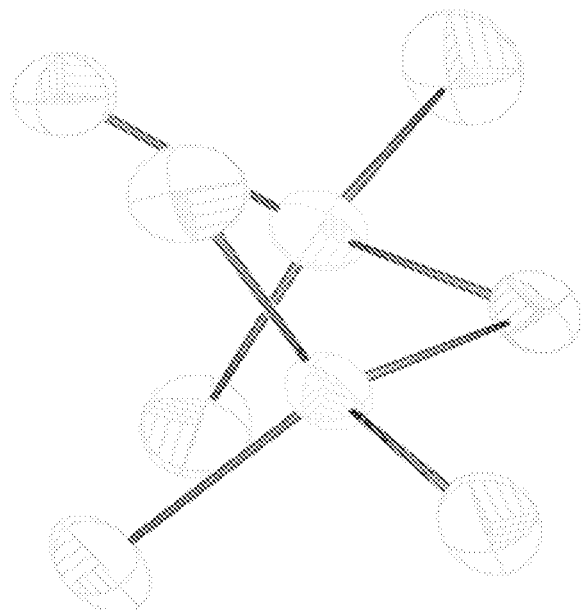
FIG. 14 depicts a molecular structure of the bis(trichlorosilyl)phosphide anion, with thermal ellipsoids shown at the 50% the probability level.
Figure 15:
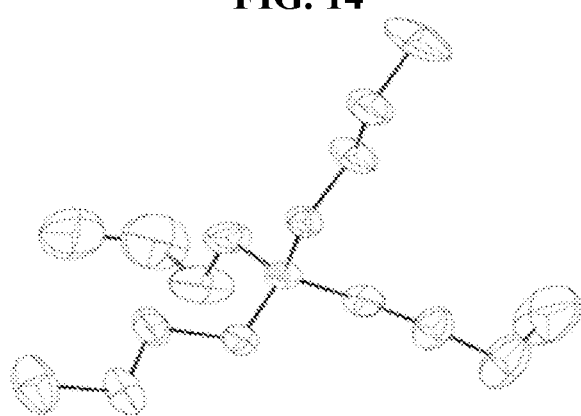
FIG. 15 depicts a molecular structure of tetrabutylammonium cation, with thermal ellipsoids shown at the 50% probability level. Hydrogen atoms have been omitted for clarity.

See FIGS. 14 and 15.

Figure 16:
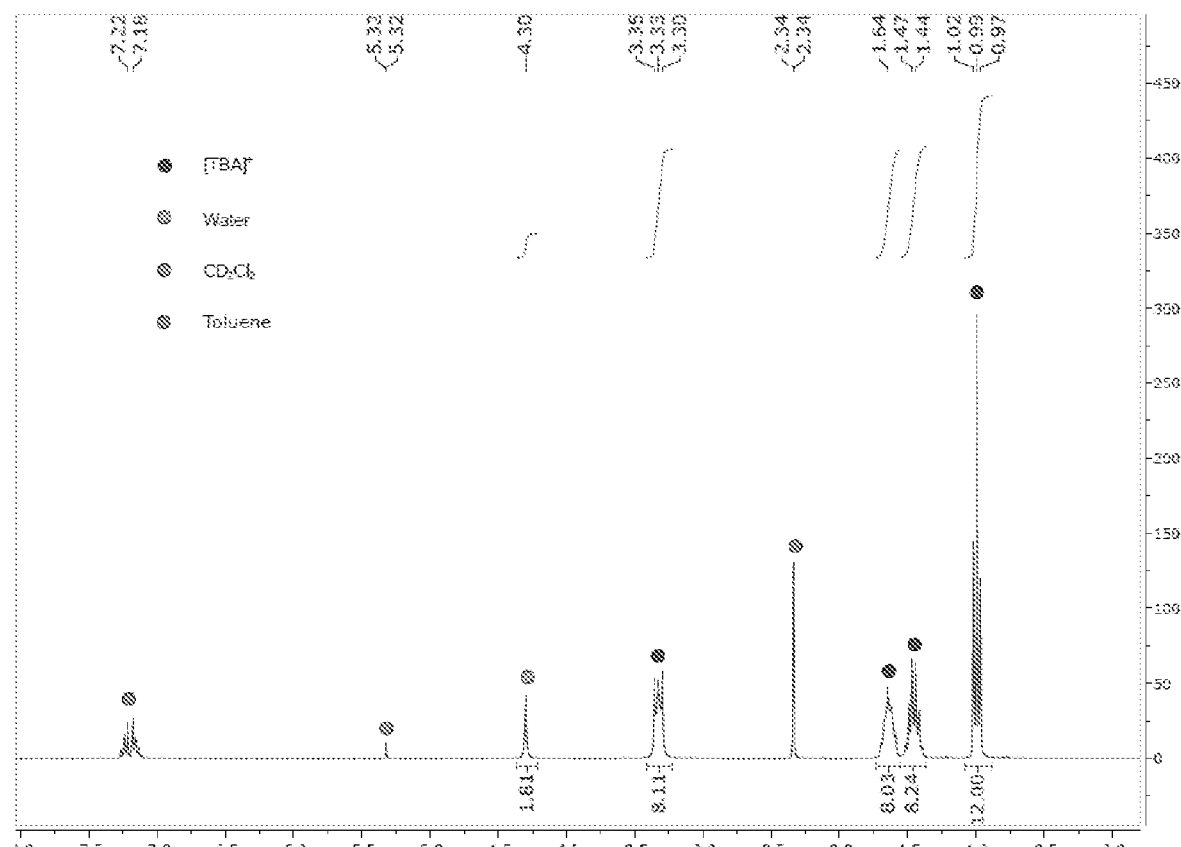
FIG. 16 depicts a $^1$H NMR spectrum of [TBA]$_3$[P$_3$O$_9$] (H$_2$O)$_2$.

FIG. 16 depicts a $^1H$ NMR spectrum of $[TBA]_3[P_3O_9]$ $(H_2O)_2$.

Figure 17:
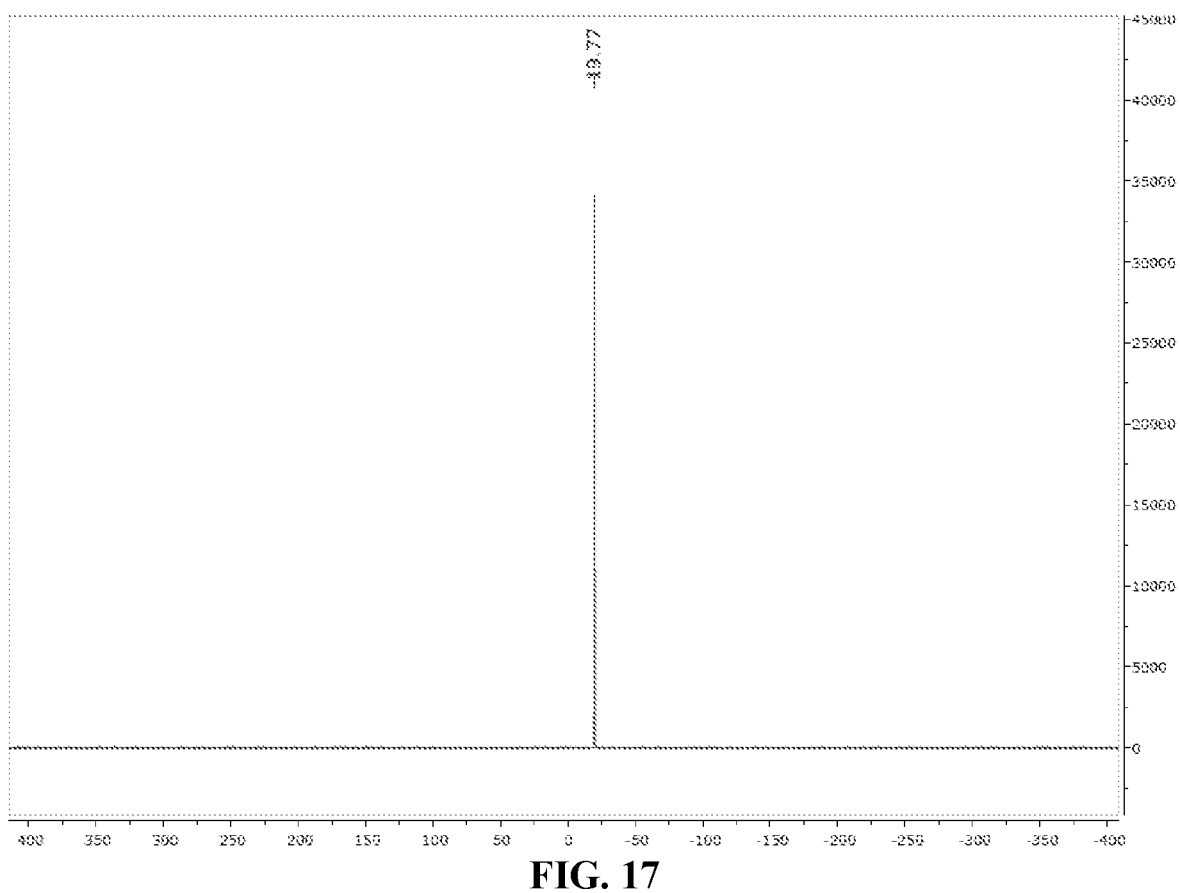
FIG. 17 depicts a $^{31}$P NMR spectrum of [TBA]3[P$_3$O$_9$] (H$_2$O)$_2$

FIG. 17 depicts a $^{31}P$ NMR spectrum of $[TBA]_3[P_3O_9](H_2O)_2$.

Figure 18:
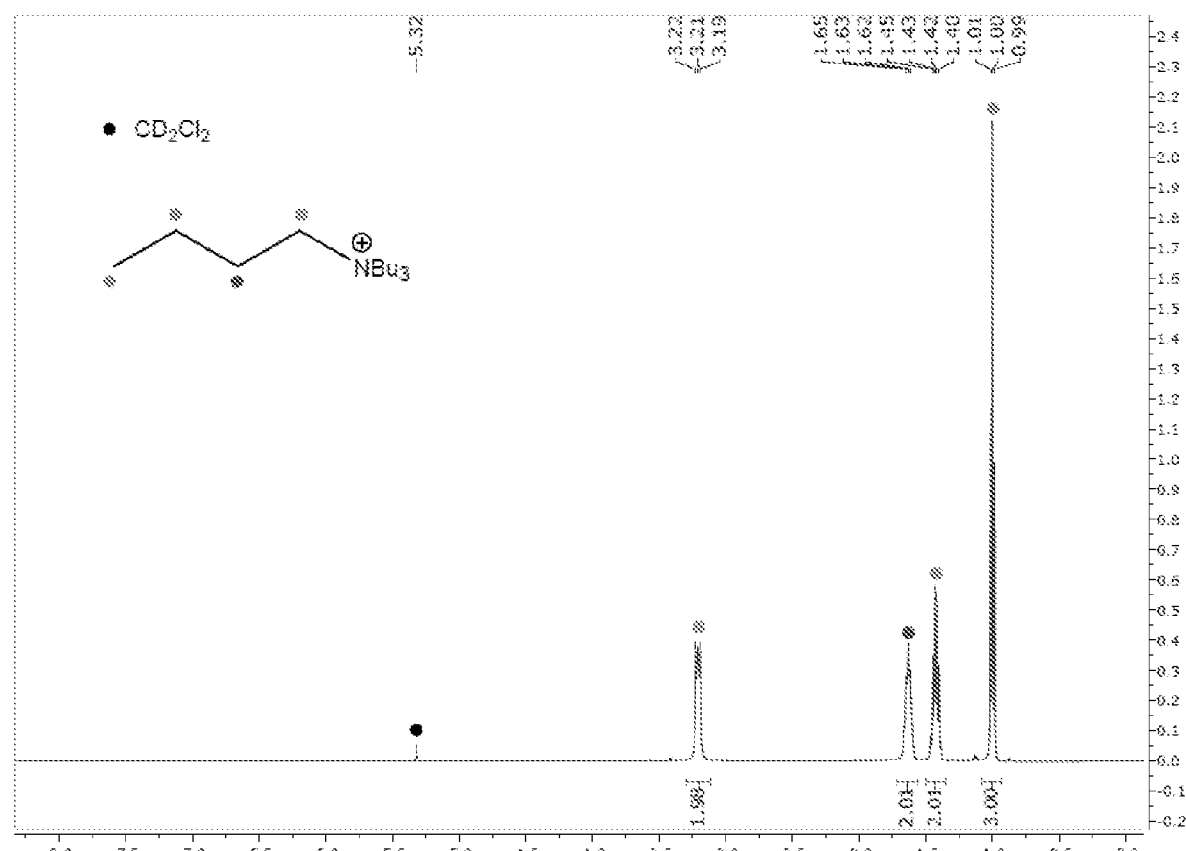
FIG. 18 depicts a $^1$H NMR spectrum of 1.

FIG. 18 depicts a $^1H$ NMR spectrum of 1.

Figure 19:
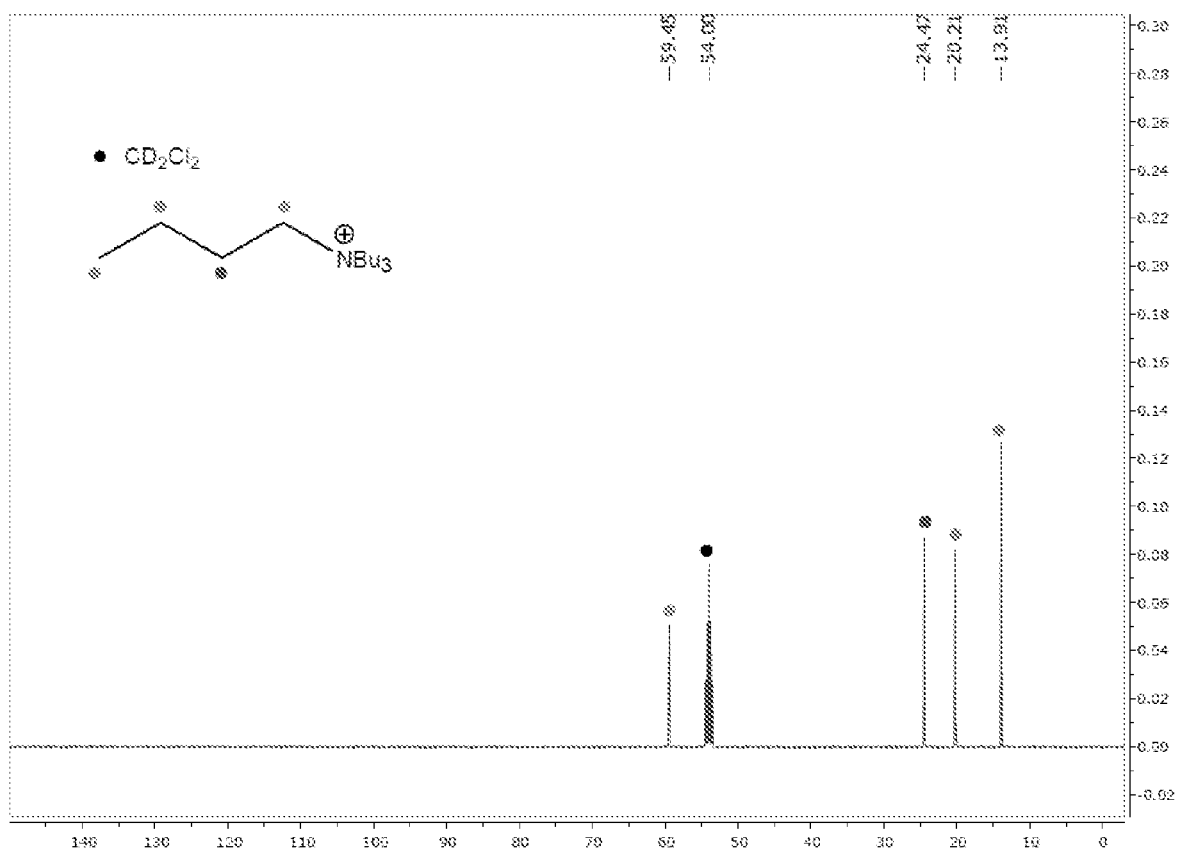
FIG. 19 depicts a $^{13}$C NMR spectrum of 1.

FIG. 19 depicts a $^{13}C$ NMR spectrum of 1.

Figure 20:
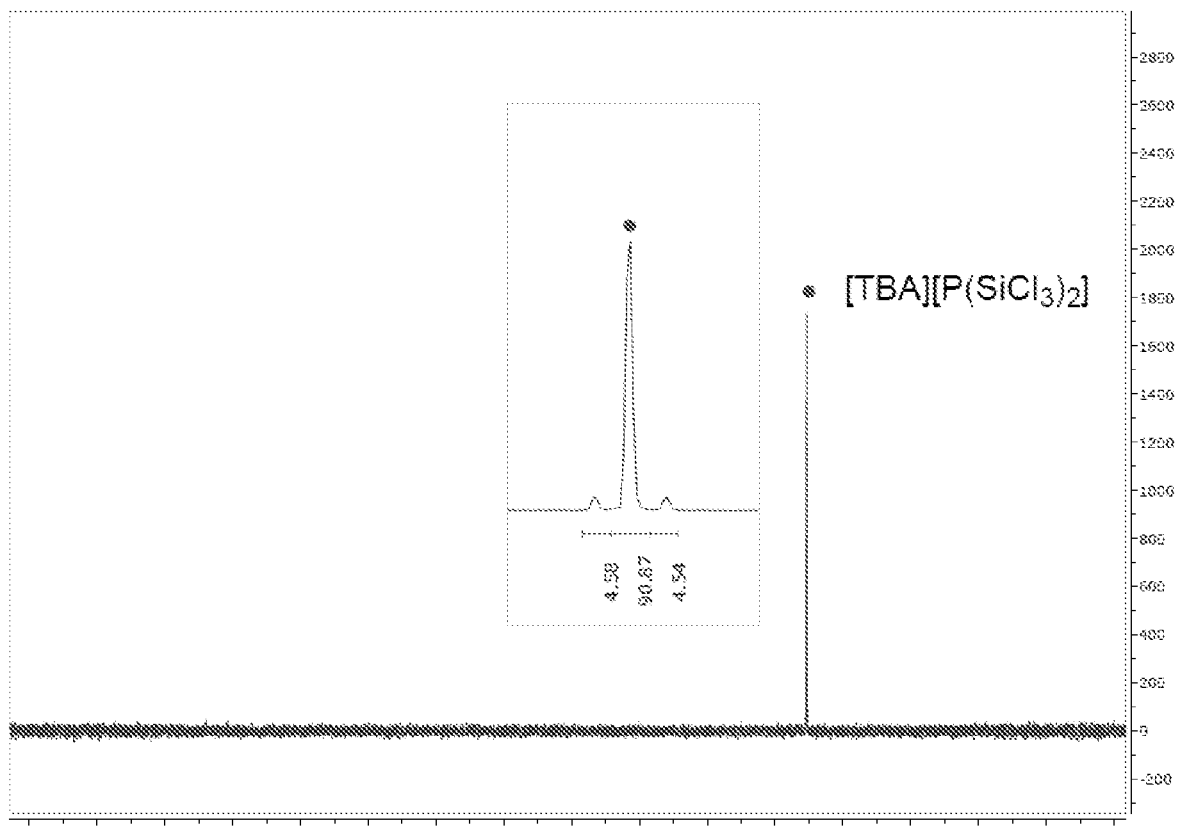
FIG. 20 depicts a $^{31}$P NMR spectrum of 1.

FIG. 20 depicts a $^{31}P$ NMR spectrum of 1.

Figure 21:
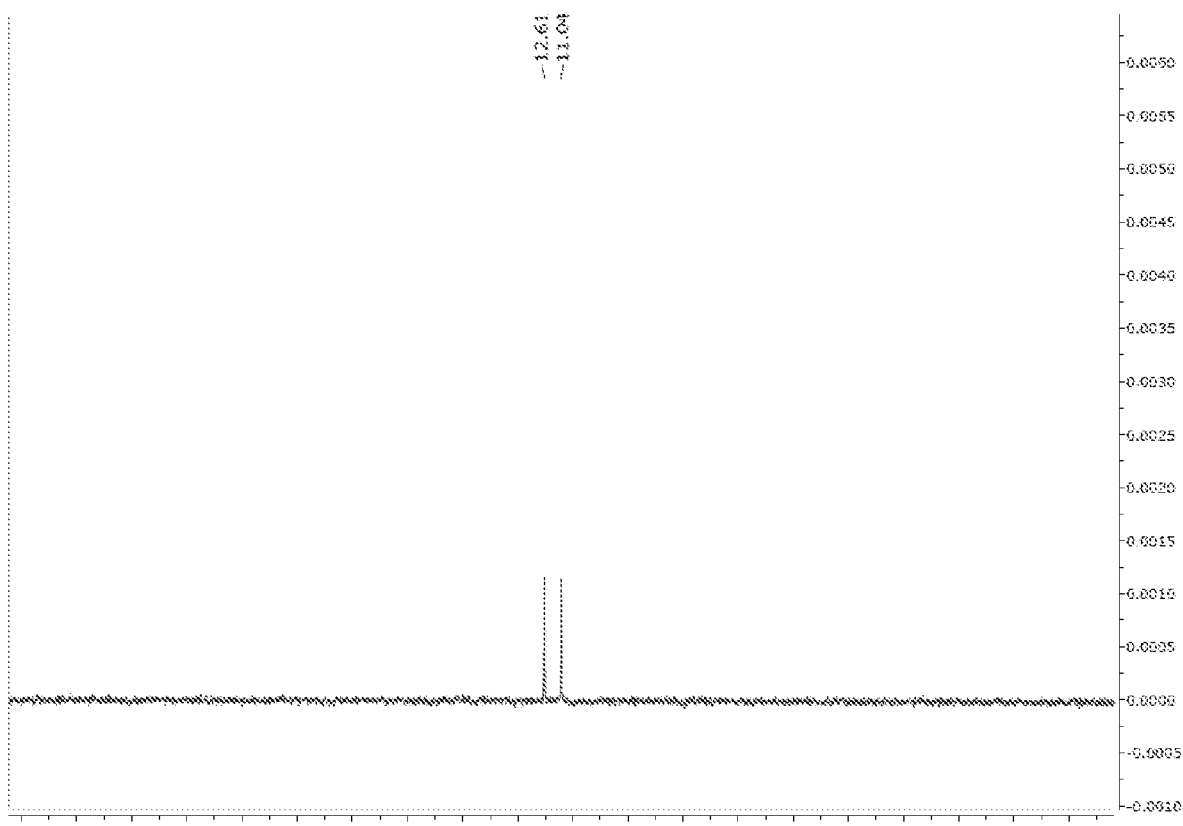
FIG. 21 depicts a $^{29}$Si NMR spectrum of 1.

FIG. 21 depicts a $^{29}Si$ NMR spectrum of 1.

Figure 22:
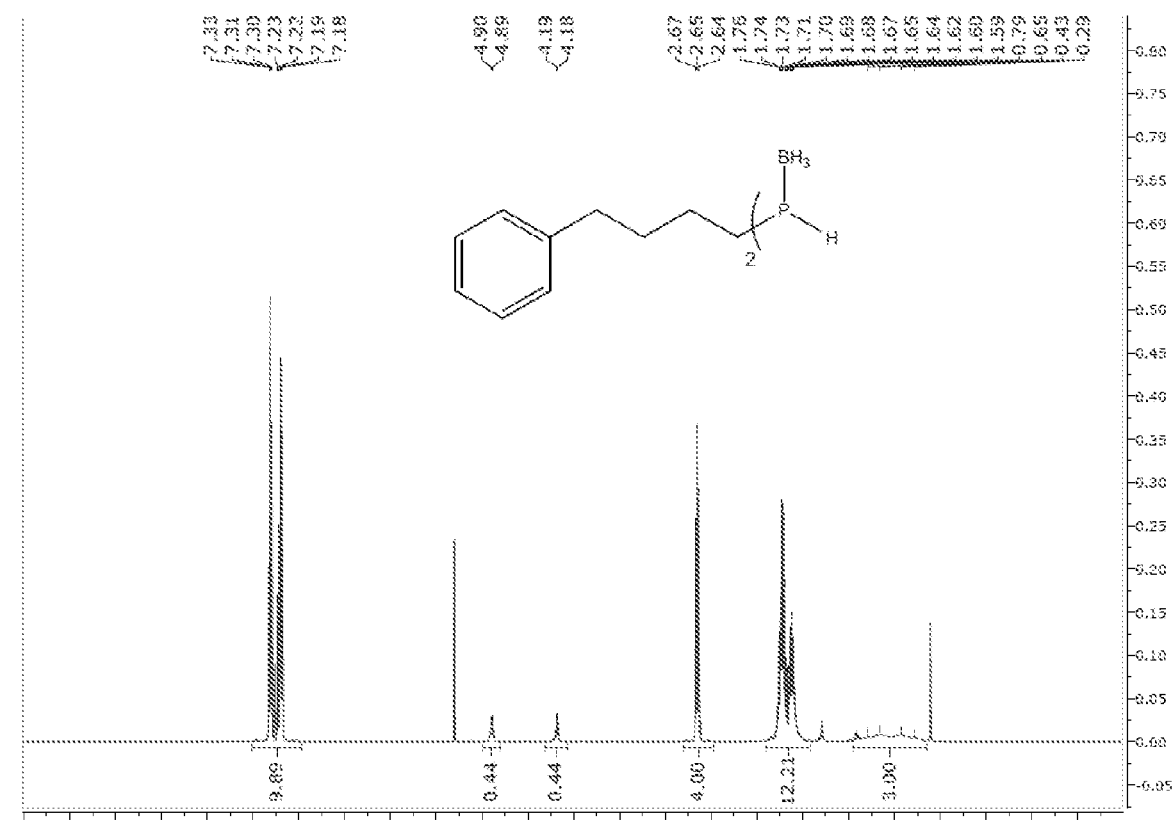
FIG. 22 depicts a $^1$H NMR spectrum of (PhCH$_2$CH$_2$CH$_2$CH$_2$)$_2$PH·BH$_3$.

FIG. 22 depicts a $^1H$ NMR spectrum of $(PhCH_2CH_2CH_2CH_2)_2PH \cdot BH_3$.

Figure 23:
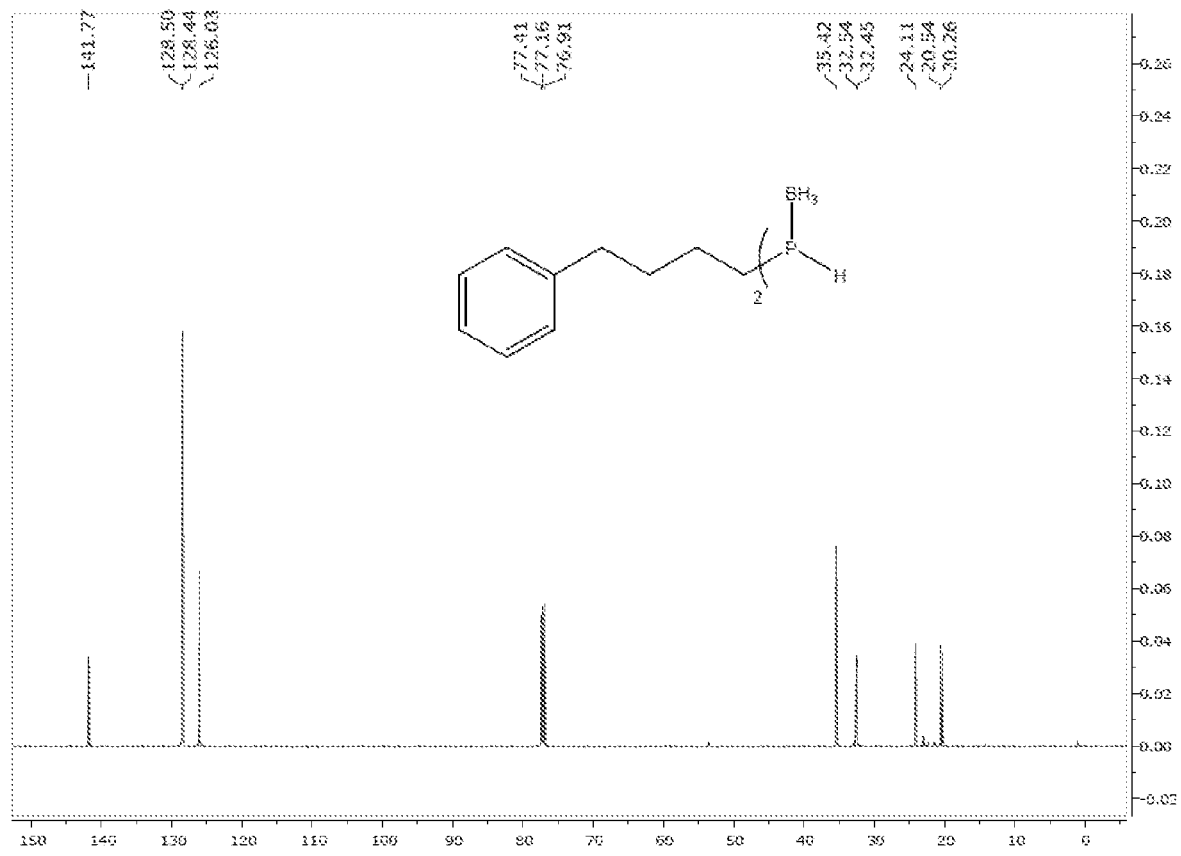
FIG. 23 depicts a $^{13}$C NMR spectrum of (PhCH$_2$CH$_2$CH$_2$CH$_2$)$_2$PH·BH$_3$.

FIG. 23 depicts a $^{13}C$ NMR spectrum of $(PhCH_2CH_2CH_2CH_2)_2PH \cdot BH_3$.

Figure 24:
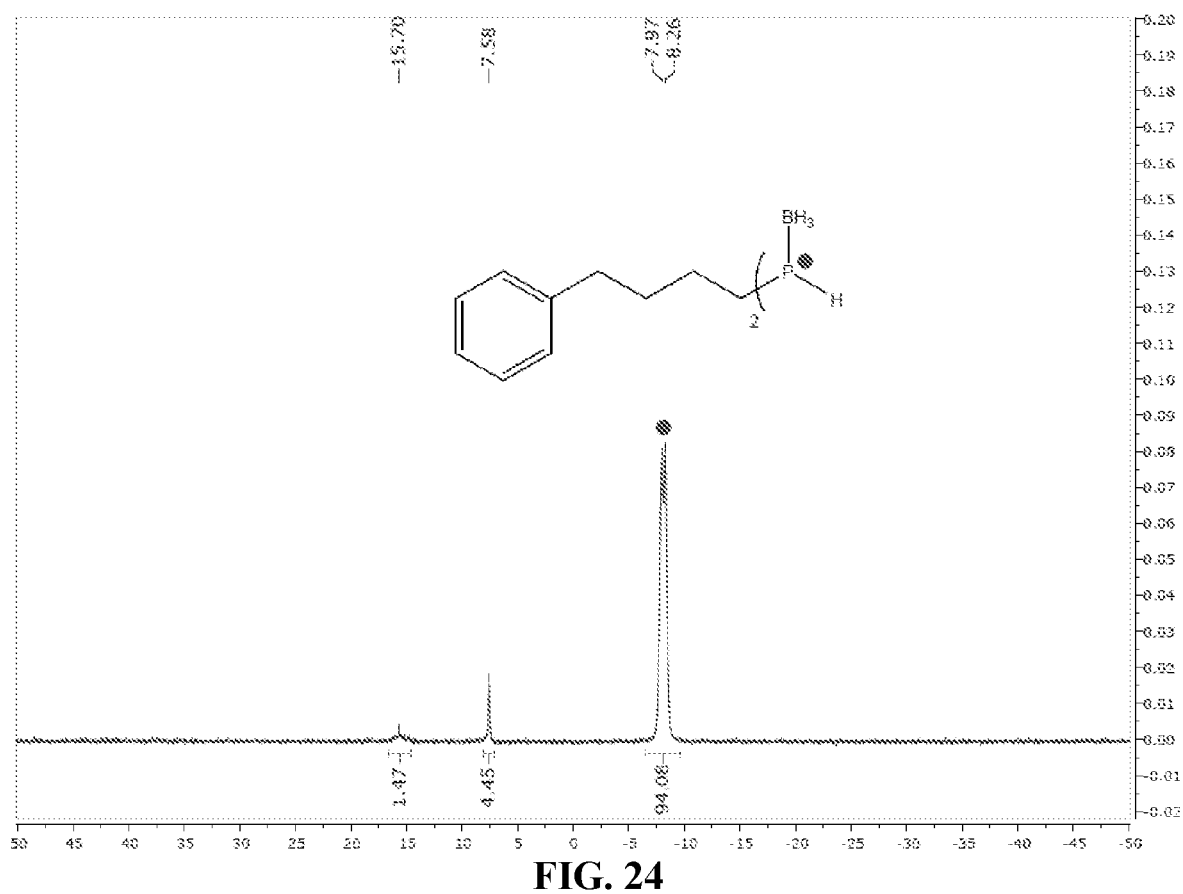
FIG. 24 depicts a $^{31}$P{$^1$H} NMR spectrum of (PhCH$_2$CH$_2$CH$_2$CH$_2$)$_2$PH·BH$_3$.

FIG. 24 depicts a $^{31}P\{^1H\}$ NMR spectrum of $(Ph(CH_2)(CH_2)(CH_2)(CH_2)_2PHBH_3$.

Figure 25:
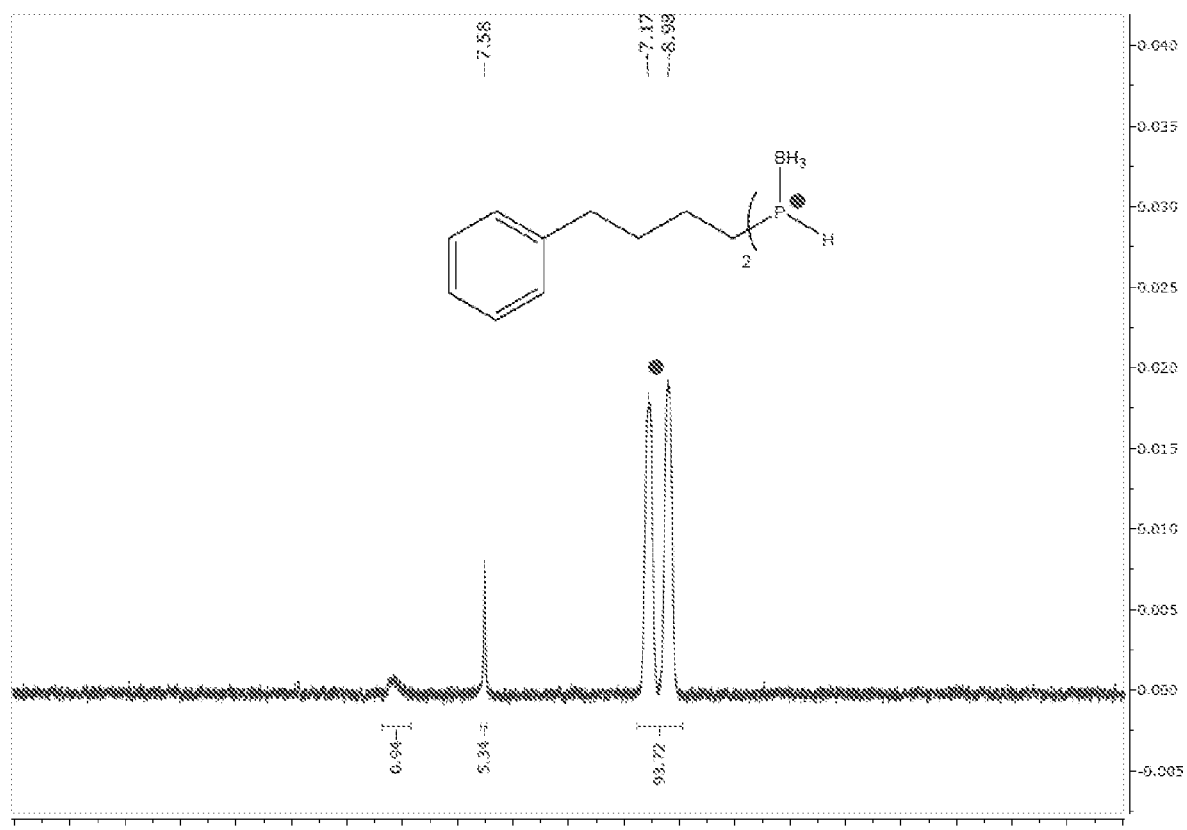
FIG. 25 depicts a $^{31}$P NMR spectrum of (PhCH$_2$CH$_2$CH$_2$CH$_2$)$_2$PH·BH$_3$.

FIG. 25 depicts a $^{31}P$ NMR spectrum of $(PhCH_2CH_2CH_2CH_2)_2PHBH_3$.

Figure 26:
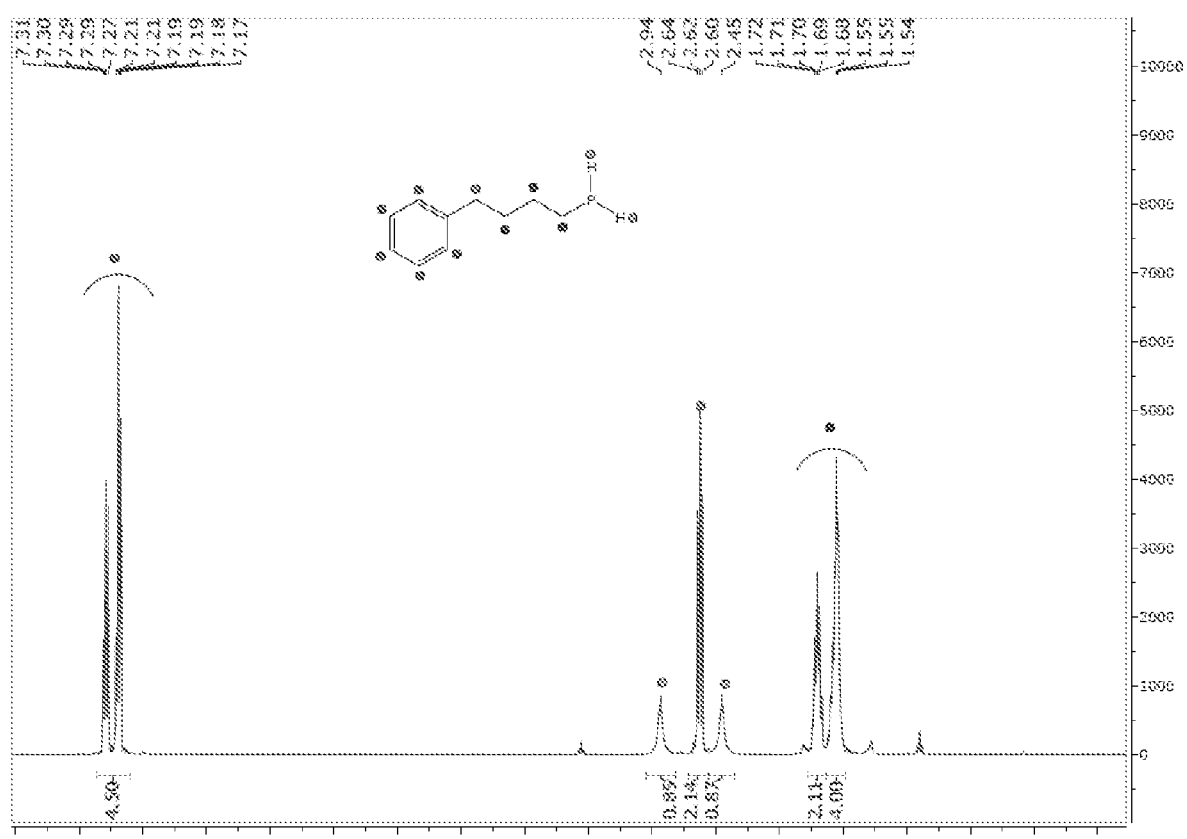
FIG. 26 depicts a $^1$H NMR spectrum of Ph(CH$_2$)$_4$PH$_2$.

FIG. 26 depicts a $^1H$ NMR spectrum of $Ph(CH_2)_4PH_2$.

Figure 27:
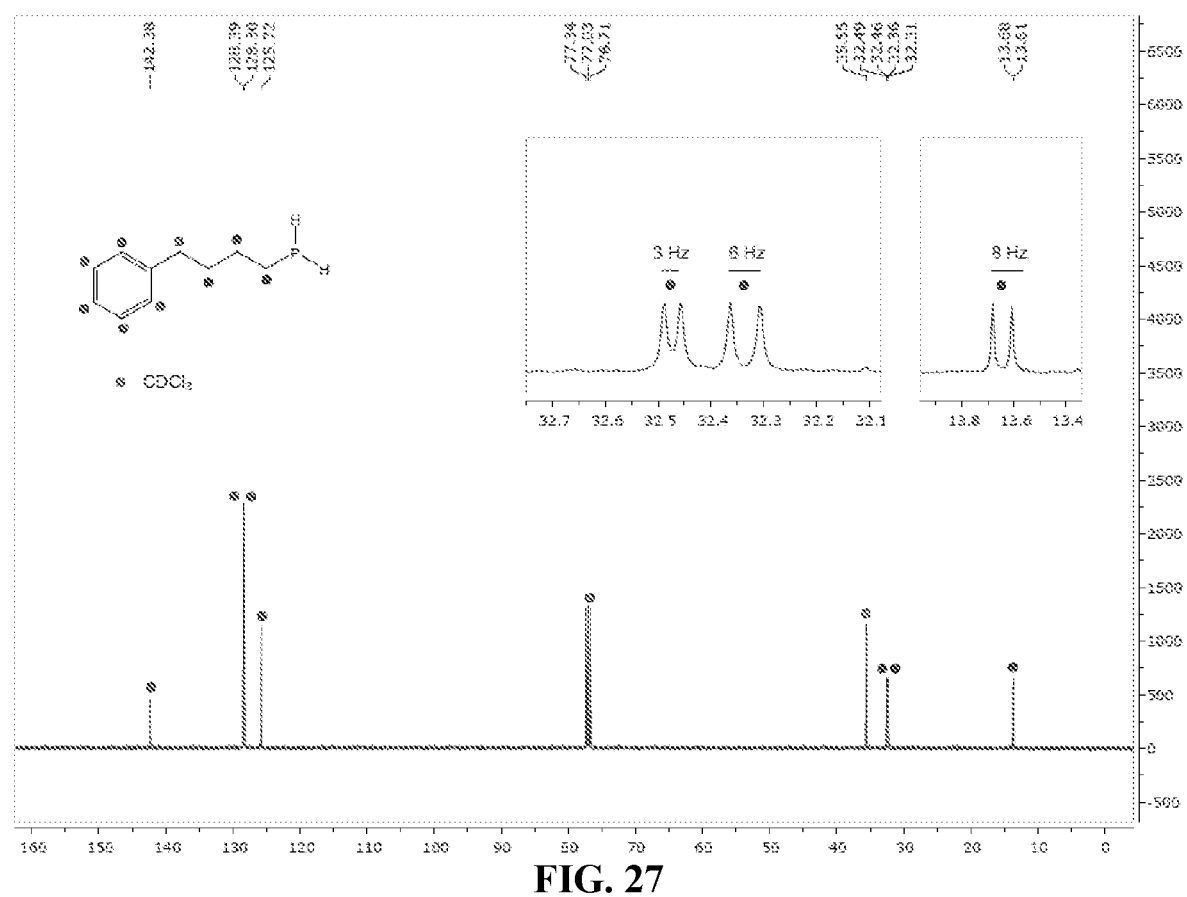
FIG. 27 depicts a $^{13}$C NMR spectrum of Ph(CH$_2$)$_4$PH$_2$.

FIG. 27 depicts a $^{13}C$ NMR spectrum of $Ph(CH_2)_4PH_2$.

Figure 28:
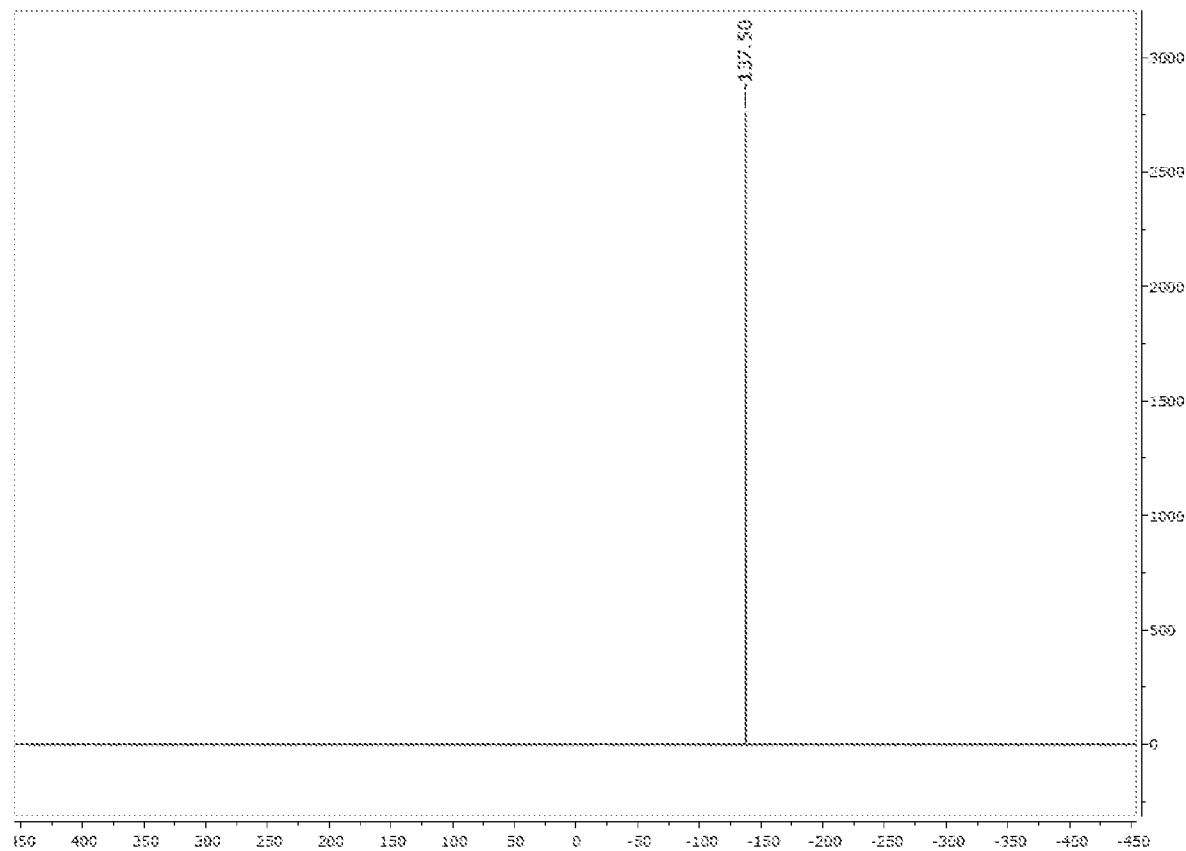
FIG. 28 depicts a $^{31}$P{1H} NMR spectrum of Ph(CH$_2$)$_4$PH$_2$.

FIG. 28 depicts a $^{31}P\{^1H\}$ NMR spectrum of $Ph(CH_2)_4PH_2$.

Figure 29:
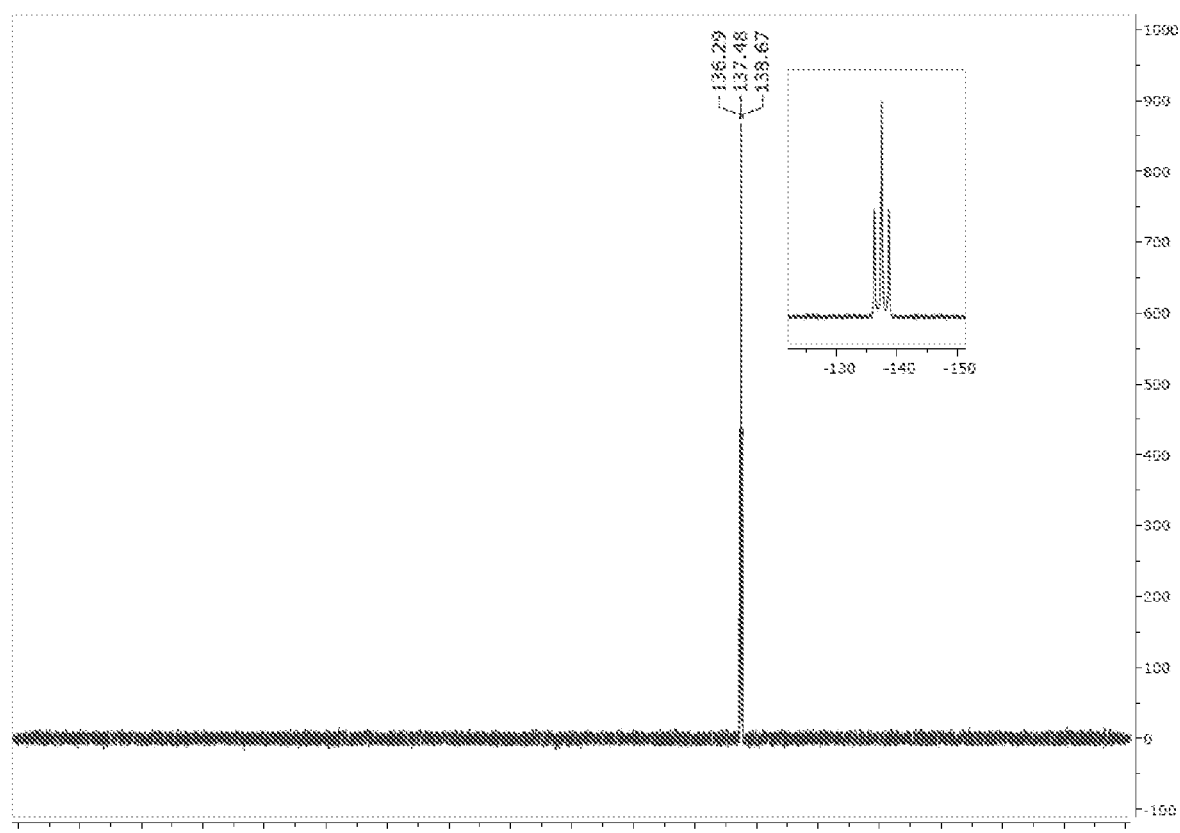
FIG. 29 depicts a $^{31}$P NMR spectrum of Ph(CH$_2$)$_4$PH$_2$.

FIG. 29 depicts a $^{31}P$ NMR spectrum of $Ph(CH_2)_4PH_2$.

TABLE 3

| X-ray crystallographic information for [TBA][1] | |
|---|---|
| CSD identification code | |
| Reciprocal net code | x8_17117 |
| Empirical formula | $C_{16}H_{36}Cl_6NPSi_2$ |
| Formula weight | 542.31 g/mol |
| Color/morphology | colorless/needle |
| Temperature | 100(2) K |
| Wavelength | 0.71073 Å |
| Crystal system | Orthorhombic |
| Space group | $P2_12_12_1$ |
| Unit cell dimensions | a = 15.511(3) Å α = 90° |
| | b = 15.511(3) Å β = 90° |
| | c = 15.511(3) Å γ = 90° |
| Volume | 5562.9(15) Å$^3$ |
| Z | 8 |
| Density (calculated) | 1.295 g/cm$^3$ |
| Absorption coefficient | 0.766 mm$^{-1}$ |
| F(000) | 2272 |
| Crystal size | 0.138 × 0.090 × 0.090 mm$^3$ |
| Theta ranges for data collection | 1.528 to 27.877° |
| Index ranges | −20 <= h <= 20, −23 <= k <= 23, |
| | −26 <= l <= 26 |
| Reflections collected | 83971 |
| Independent reflections | 13268 [R(int) = 0.0727] |
| Completeness to θ = 25.242° | 100.0% |
| Absorption correction | Semi-empirical from equivalents |
| Refinement method | Full-matrix least-squares on F$^2$ |
| Data\restraints\parameters | 13268\1365\663 |

TABLE 3-continued

X-ray crystallographic information for [TBA][1]

| | |
|---|---|
| Goodness-of-fit on $F^2$ | 1.035 |
| Final R indices [I > 2σ(l)] | $R_1$ = 0.0533, $wR_2$ = 0.1138 |
| R indicies (all data) | $R_1$ = 0.0759, $wR_2$ = 0.1239 |
| Absolute structure parameter | −0.01(3) |
| Extinction coefficient | n\a |
| Largest diff. peak and hole | 0.764 and −0.474 e.A$^{-3}$ |

Synthesis of Methylphosphonic Acid and Dimethylphosphinic Acid from Trimetaphosphate In a glovebox, [TBA]$_3$[P$_3$O$_9$]·2H$_2$O (110 mg, 0.11 mmol, 1.0 equiv.) was weighed into a Schlenk flask (15 mL). THF (3 mL) was added to the flask which was also equipped with a stir bar. The flask was removed from the glovebox and cooled to 0 degrees C. in an ice bath. A di-ethyl ether solution of methyl magnesium bromide (1 mL, 3.0 M, 3.0 mmol, 27 equiv.) was added to the flask under a positive flow of nitrogen. The solution was allowed to warm to room temperature over the course of one hour before stirring for an additional 23 h. The resulting solution was carefully added by pipette to hydrochloric acid (1 M, 10 mL). The resulting aqueous solution was washed with DCM (10 mL). The hydrochloric acid was removed by azeotropic evaporation with toluene to give a white crystalline solid. Methylphosphonic acid: $^1$H NMR (500 MHz, D$_2$O, δ) 1.31 (d, 17 Hz). $^{31}$P{$^1$H} NMR (203 MHz, D2O, δ) 24.9 (s). $^{31}$P NMR (203 MHz, D$_2$O, δ) 24.9 (q, 17 Hz). Dimethylphosphinic acid: $^1$H NMR (500 MHz, D$_2$O, δ) 1.28 (d, 14 Hz). $^{31}$P{$^1$H} NMR (203 MHz, D$_2$O, δ) 45.5 (s). $^{31}$P NMR (203 MHz, D$_2$O, δ) 45.5 (sept., 14 Hz).

Representative Procedure for the Preparation of HP(SiCl$_3$)$_2$

Figure 30:
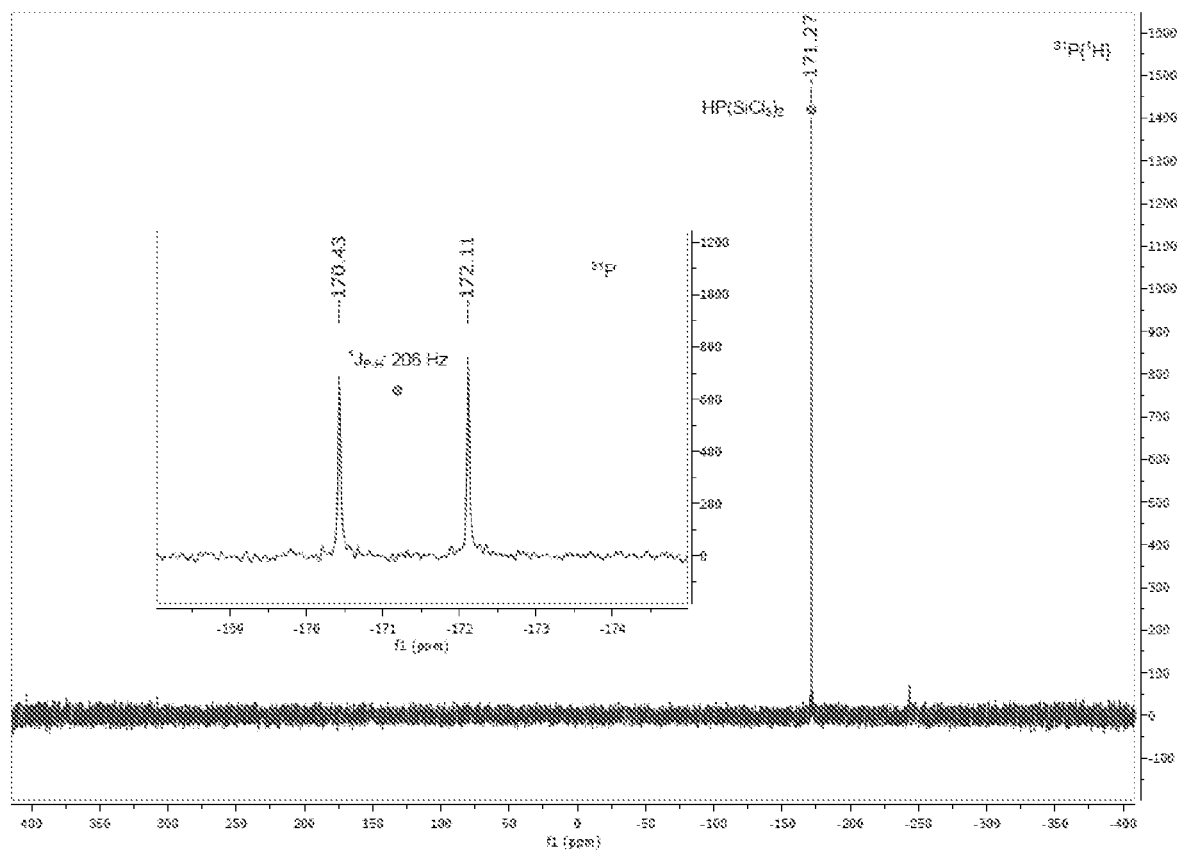
FIG. 30 depicts a $^1$H NMR spectrum of HP(SiCl$_3$)$_2$. Inset is $^{31}$P NMR spectrum of HP(SiCl$_3$)$_2$.

In a glovebox, [TBA][P(SiCl$_3$)$_2$] (40 mg, 0.074 mmol, 1 equiv.) and trifluoromethanesulfonic (triflic) acid (11 mg, 0.074 mmol, 1 equiv.) were weighed into separate vials. To both vials, DCM (0.3 mL) was added. The solutions were frozen in the glovebox coldwell. The frozen solutions were removed from the coldwell, and upon thawing the DCM solution of triflic acid was added to the solution of [TBA][P(SiCl$_3$)$_2$]. HP(SiCl$_3$)$_2$: $^{31}$P{$^1$H} NMR (121 MHz, CD$_2$Cl$_2$, δ) −171.3, $^1J_{P-Si}$=56 Hz. 31P NMR (121 MHz, CD$_2$Cl$_2$, δ) −171.3, (d, $^1J_{P-H}$=206 Hz). See, FIG. 30.

Preparation of [TBA][P(SiCl$_3$)$_2$]

General notes and procedure for the purification of [TBA][1]

[TBA][1] is particularly water sensitive; rigorously dry solvents and glassware should be used throughout the preparative procedure. In addition to elemental analysis, the purity of [TBA][1] can be readily determined by its solubility; 300 mg of material should dissolve in ca. 1 mL of DCM to produce a clear colorless solution. Undissolved material indicates an impure substance. $^1$H and $^{31}$P NMR spectroscopy are typically not suffcient to determine the purity of [TBA][1]. Recrystallization of impure material can be accomplished using DCM and pentane at −35° C. Atypical procedure involves taking 1 gram of impure material, dissolving it in DCM (20 mL) and filtering through a pipette plug containing diatomaceous earth (1 cm bed). If the pipette filter becomes blocked, additional pipette filters can be used. Alternatively, a frit (fine porosity, 15 mL) containing diatomaceous earth (1 cm bed) can be used. The filtrate is concentrated to 4 mL; if precipitate is observed then the solution is filtered through a filter pipette containing diatomaceous earth (1 cm). Addition of pentane (16 mL, 4:1 v:v) produces a cloudy solution. Generally, addition of the pentane with agitation is preferred to careful layering; the latter sometimes does not result in formation of solid material and instead produces an oil. The resulting mixture is placed in a freezer at −35° C. overnight, after which time a white precipitate develops. Occasionally, this precipitate develops only after shaking the vial, or scratching with a metal spatula. The solids are collected on a frit (15 mL, fine porosity) while the mixture is still cold, then quickly washed with pentane (3×7mL, −35° C). The material is dried for an hour to give spectroscopically pure [TBA][1].

From Phosphoric Acid

In a glovebox, crystalline phosphoric acid (294 mg, 3.0 mmol, 1 equiv.) and tetrabutylammonium chloride (534 mg, 3.0 mmol, 1 equiv.) were weighed into a 25 mL steel pressure reactor. The reactor was sealed using Teflon tape, removed from the glovebox and cycled onto a Schlenk line in the fume hood. Against a positive flow of nitrogen, trichlorosilane (10.0 mL, 100.0 mmol, 33.3 equiv.) was added using a syringe. The reactor was sealed and heated to 110° C. behind a blast shield for 72 h. After this time, the reactor was allowed to cool to 23° C., then vented to an oil bubbler followed by a water bubbler in series. The purpose of the water bubbler was to scrub moisture reactive gases. Volatile material was removed from the reactor in vacuo for 2 hours. The reactor was brought into the glovebox, and the white residue that formed was stirred in THF (20 mL) for five minutes. The resulting mixture was filtered through a frit (fine porosity, 15 mL) that contained diatomaceous earth (2 cm bed). The diatomaceous earth was washed with THF (3×7 mL). Volatile material was removed filtrate in vacuo to give a colorless oil. The oil was triturated with diethyl ether (3×7 mL) to give a sticky white solid. The material was dried for an additional two hours, then the solids dissolved in DCM (3 mL). Solid material was removed from the mixture by passing through a piece of filter paper in a pipette into a vial (20 mL). The ask was rinsed with additional DCM (1 mL) which was also passed through the filter paper into the vial. Diethyl ether (16 mL) was added to the vial which was taped shut with electrical tape then stored in the freezer (−35° C.). The precipitate that formed was collected on a frit (fine porosity, 15 mL) and washed with diethyl ether (−35° C., 3–7 mL) then transferred to a vial and dried to constant mass.

From [TBA][H$_2$PO$_4$]

In the glovebox, [TBA][H$_2$PO$_4$] (1017 mg, 3.0 mmol, 1 equiv.) was weighed into a steel pressure reactor equipped with a stir bar. The reactor was sealed using Teflon tape and removed from the glovebox. On the Schlenk line, trichlorosilane (10.0 mL, 13.4 g, 99.2 mmol, 33 equiv.) was added against a positive pressure of nitrogen. The reactor was sealed and placed in a heating mantle filled with aluminum shot, then heated to 110° C. This temperature was determined by taking the average temperature at the bottom (120° C.) and surface (100° C.) of the aluminum shot in the heating mantle. The reaction was heated for 6 days, then vented to an oil bubbler followed by a water bubbler in series, to scrub any moisture reactive gases. Volatile material was removed in vacuo on the Schlenk line, then the reactor was brought into the glovebox. The solid white material was dissolved in THF (20 mL) then passed through a frit (fine porosity, 30 mL) containing diatomaceous earth (1 cm bed). The frit was washed with additional THF (2=10 mL). Volatile material was removed from the filtrate to give a white solid that was triturated with ether (3–5 mL). The solids so obtained were dissolved in DCM (20 mL) then passed through a fit (fine porosity, 15 mL) containing diatomaceous earth (1 cm bed). The diatomaceous earth was washed with DCM (2-2 mL), then volatile material was removed from the filtrate in vacuo. The resulting oil was redissolved in DCM (4 mL) then filtered into a fresh vial through a pipette filter. Ether (16 mL) was added to the vial which was taped shut with electrical tape and placed in the freezer overnight (−35° C.). The solids obtained were collected on a frit (fine porosity, 15 mL) and washed with pentane (−35° C., 3–7 mL). The material was dried to constant mass (1.016 g, 1.874 mmol, 62% yield). The $^1$H and $^{31}$P NMR spectra were consistent with the published data.

Figure 34:
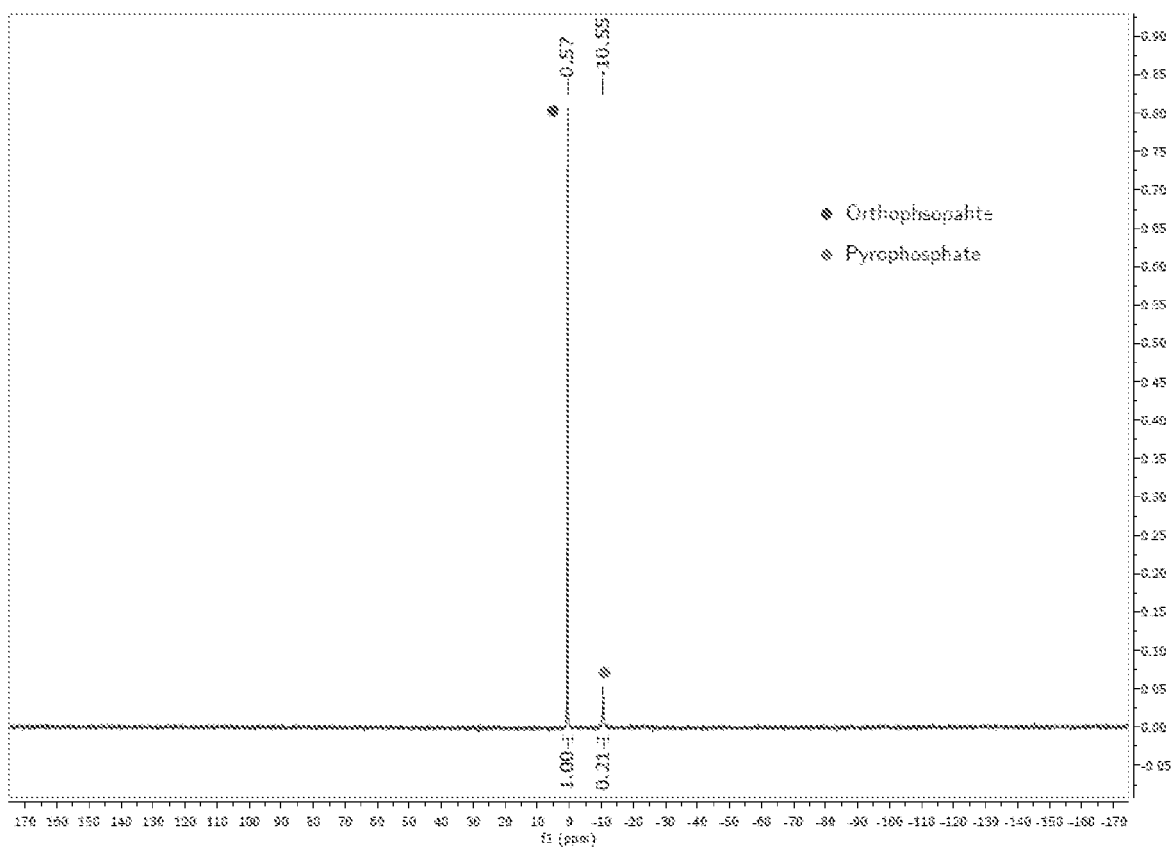
FIG. 34 depicts a $^{31}$P NMR spectrum of pyrophosphate.

Observation of pyrophosphate under the conditions used to prepare [TBA][1] A small portion (ca. 50 mg) of the crude white material obtained after removing volatile material from the reaction vessel was placed in a pipette filter and washed with THF (5 mL) then DCM (10 mL). The white material was removed from the glovebox and dissolved in water (0.7 mL), then transferred to an NMR tube and analyzed by $^{31}$P NMR spectroscopy. Two species were observed and were assigned as phosphate and pyrophosphate based on their chemical shifts. $^{31}$P NMR (203 MHz, H$_2$O, δ) 0.57 (orthophosphate), −10.55 (pyrophosphate). See FIG. 34.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features and basic principles of the invention.

What is claimed is:

1. A compound comprising a bis(silyl)phosphide and a cation wherein the silyl is H$_n$SiX$_{3-n}$ where X is a halogen, alkoxy, aryloxy, amido or arylamido and n is 0, 1, 2 or 3.

2. The compound of claim 1, wherein the cation includes hydrogen, a nitrogen-based cation, a phosphorus-based cation, an alkali metal cation, an alkali-earth metal cation, or an ionic liquid cation.

3. The compound of claim 1, where the cation is [R$_4$N]$^+$, where R is nBu, sBu, iBu, nPr, iPr, Et, or Me.

4. The compound of claim 1, wherein X is a halogen or alkoxy.

5. The compound of claim 1, wherein the cation includes [R$_4$N]$^+$, where R is nBu.

6. The compound of claim 1, wherein the silyl is SiX$_3$ where X is a halogen.

7. The compound of claim 1, wherein the cation is [R4N]$^+$, where R is nBu and the silyl is SiX$_3$ where X is chloro.

8. The compound of claim 1, wherein the silyl is SiX$_3$ where X is fluoro.

9. A method of preparing a bis(silyl)phosphide comprising contacting a phosphate-source with a silane reducing agent wherein the silyl is H$_n$SiX$_{4-n}$ where X is a halogen, alkoxy, aryloxy, amido or arylamido and n is 1, 2 or 3.

10. The method of claim 9, wherein X is a halogen or alkoxy, aryloxy.

11. The method of claim 9, wherein the silane reducing agent is H$_n$SiX$_{4-n}$ where X is a chloro and n is 1.

12. The method of claim 9, wherein the phosphate-source includes a phosphoric acid, a metaphosphate or an orthophosphate.

13. The method of claim 9, wherein the phosphate-source includes H$_3$PO$_4$, MH$_2$PO$_4$, M$_2$HPO$_4$, M$_3$PO$_4$, where M is an alkali metal ion or organic cation.

14. The method of claim 9, wherein the phosphate-source includes a metaphosphates of varying ring size having a formula: [P$_m$O$_{3m}$]$^{m-}$, where m is 3-6 or a linear metaphosphate having the formula (HPO$_3$)$_m$, wherein m is 3-6, or salts thereof.

15. The method of claim 9, wherein the phosphate-source and the silane reducing agent are heated in a closed vessel.

16. The method of claim 9, wherein the phosphate-source includes [P$_3$O$_9$]$^{3-}$.

17. A method of preparing a phosphorus chemical comprising contacting a bis(silyl)phosphide with an electrophilic reagent to form the phosphorus chemical wherein the silyl is H$_n$SiX$_{3-n}$ where X is a halogen, alkoxy, aryloxy, amido or arylamido and n is 0, 1, 2 or 3.

18. The method of claim 17, wherein the phosphorus chemical is phosphine, a primary organic phosphine, a secondary organic silyl phosphine, a secondary organic phosphine, a tertiary organic silyl phosphine, a metal phosphide, an organophosphinic acid, an organo phosphonate, a secondary organic phosphine oxide, a diorganophosphinic acid, a phosphine, a monoacylphosphine, a diacylphosphine, a triacylphosphine or hexafluorophosphate anion.

19. The method of claim 17, wherein the phosphorus chemical is a secondary organic phosphine, further comprising protecting the phosphine with a borane.

20. A method of creating a carbon-phosphorus bond comprising contacting a phosphate source including a compound of claim 1 with an alkylating agent.

* * * * *